United States Patent
Matsuoka et al.

(10) Patent No.: US 6,678,072 B1
(45) Date of Patent: *Jan. 13, 2004

(54) PRINTER CONTROL APPARATUS AND METHOD

(75) Inventors: Yasushi Matsuoka, Yokohama (JP); Hideo Honma, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/902,326

(22) Filed: Jul. 29, 1997

(30) Foreign Application Priority Data

Jul. 31, 1996 (JP) ............................................. 8-202339
Sep. 26, 1996 (JP) ............................................. 8-254788

(51) Int. Cl.⁷ ............................................. G06K 15/00
(52) U.S. Cl. ......................................... 358/2.1; 358/1.2
(58) Field of Search ............................... 358/462, 464, 358/1.2, 1.9, 3.01, 2.1; 382/176, 299; 395/102

(56) References Cited

U.S. PATENT DOCUMENTS

| | | | | |
|---|---|---|---|---|
| 4,004,079 A | * | 1/1977 | Boston | 358/256 |
| 4,668,995 A | * | 5/1987 | Cen et al. | 358/282 |
| 5,546,474 A | * | 8/1996 | Zuniga | 382/176 |
| 5,731,823 A | * | 3/1998 | Miller et al. | 347/5 |
| 6,002,848 A | * | 12/1999 | Takahashi | 395/116 |

* cited by examiner

Primary Examiner—Yon J. Couso
(74) Attorney, Agent, or Firm—Fitzpatrick, Cella, Harper & Scinto

(57) ABSTRACT

It is an object to enable a printer to print at a high speed from drawing data including each drawing object of an image, a text, and graphics in the same page and to form print information in which a deterioration of a picture quality is small. An object-unit resolution discriminator discriminates attributes of drawing objects in print data which is formed by a host, discriminates a kind of resolution processing of each drawing object, selects either one of a high resolution rasterizer and a normal resolution rasterizer every drawing object on the basis of the discrimination result, and switches a resolution processing. A page detection/resolution controller switches a resolution mode for the printer driver to draw every page on the basis of the attribute detected by a page parameter discriminator for analyzing the print data and detecting the attributes of the drawing objects of each page.

20 Claims, 15 Drawing Sheets

MEM MEDIUM (FD/CD-ROM)

DIRECTORY INFORMATION

FIRST DATA PROCESSING PROGRAM
PROGRAM CODES CORRESPONDING TO
THE STEPS OF THE FLOWCHART OF
FIG. 2

SECOND DATA PROCESSING PROGRAM
PROGRAM CODES CORRESPONDING TO
THE STEPS OF THE FLOWCHART OF
FIG. 4

MEM MAP

FIG. 5

MEM MEDIUM (FD/CD-ROM)

| DIRECTORY INFORMATION |
|---|
| FIRST DATA PROCESSING PROGRAM PROGRAM CODES CORRESPONDING TO THE STEPS OF THE FLOWCHART OF FIG. 8 |
| SECOND DATA PROCESSING PROGRAM PROGRAM CODES CORRESPONDING TO THE STEPS OF THE FLOWCHART OF FIG. 9 |
| THIRD DATA PROCESSING PROGRAM PROGRAM CODES CORRESPONDING TO THE STEPS OF THE FLOWCHART OF FIG. 10 |
| FORTH DATA PROCESSING PROGRAM PROGRAM CODES CORRESPONDING TO THE STEPS OF THE FLOWCHART OF FIG. 11 |
| FIFTH DATA PROCESSING PROGRAM PROGRAM CODES CORRESPONDING TO THE STEPS OF THE FLOWCHART OF FIG. 12 |
| SIXTH DATA PROCESSING PROGRAM PROGRAM CODES CORRESPONDING TO THE STEPS OF THE FLOWCHART OF FIG. 13 |
| |

MEM MAP

FIG. 14

PRINTER CONTROL APPARATUS AND METHOD

BACKGROUND OF THE INVENTION

1. Field of the Invention

The invention relates to a printer control apparatus and printer control method for allowing a printer to convert a drawing object which is formed by an application program into print information that can be printed.

2. Related Background Art

Hitherto, an operation such that a processing resolution of a rasterization is switched on an object unit basis or on a page unit basis until data is transmitted from a drawing control system (for example, GDI) to a printer driver and an output image is formed is not performed.

For example, in case of executing a printing process on the host side, an application program converts data to be printed into a drawing control system (for example, GDI) command by using a drawing control system (for example, GDI or the like) function. Such a system accumulates data into a relevant command disk, rasterizes the data of one band, and transmits the rasterized data to the printer driver. The printer driver executes an image process to the rasterized data and transmits the print data obtained by converting the data after completion of the image process into a printer control command to the system. The system repeats a process such that the print data is outputted to a printer or the like until the end of one page.

According to a present application to form a document and draw in a data processing apparatus, a data processing function is remarkably improved and the user can form a composite document including a text, a figure (hereinafter, referred to as graphics), and an image. The number of opportunities such that the user prints such a composite document including the text, graphics, and image by a printer increases.

FIG. 15 is a block diagram for explaining a construction of such a kind of print control system. The print control system is constructed by a host (PC) 100 serving as a data source, a printer 102 serving as an output source, and the like.

In the diagram, an application program 103 sequentially transmits formed print job data to a drawing control system 104. The drawing control system 104 converts the print job data into data of a form such that a drawing process can be performed by the printer driver 111 and transmits the converted data to a spooler 105. The data is made up of a logical drawing object and drawing control information for the printer 102. The drawing control system 104 is ordinarily a program at a system level and, for example, the GDI corresponds to it in the Windows (trade name).

The spooler 105 sets an output of the drawing control system 104 into a spool file 108 and notifies a queue controller 106 of a fact that the spool has been completed, thereby allowing a queueing process of a print job to be executed.

The queue controller 106 manages the executing order of the printing process on a print job unit basis. A message informing that the print job has been set into the spool file 108 is received from the spooler 105 and the print job is registered into a print queue. A despooler 109 is activated, thereby allowing an output of the print job to be executed ordinarily from the head (the oldest print job) of the queue.

The despooler 109 extracts a spool file of the print job instructed in the queue controller 106 and transmits the spool file to a printer driver 111.

The printer driver 111 converts the logical drawing object and the drawing control information for the printer 102 which were formed by the drawing control system 104 into physical drawing information and control information which can be recognized by the printer 102 and transmits those information to the printer 102 through an I/O controller 112.

The I/O controller 112 performs a data buffering and an I/O control to transmit a data stream formed by the printer driver 111 to the printer 102.

A user interface 901 is an interface for the user to instruct an operating mode of the printer driver 111. When the printing process is started, the application generally opens a dialog box. In the dialog box, the user instructs an operating mode and parameters concerning the other driver processes.

As a processing resolution of the printer driver 111 and a resolution provided for the printer 102, hitherto, the driver process is ordinarily executed at a resolution of a printer engine.

However, in association with the realization of a high resolution of the printer engine in recent years, in the driver process of the inherent resolution, the processing time is long and in data such as image data or the like which needs a gradation, it is difficult to perform a print expression at a high quality in a mere high resolution processing.

Therefore, there is considered a method whereby a low resolution processing is executed for the image data by a raster process of the driver and a gradation expression is effectively used by a density pattern method or the like in order to realize a high resolution of the printer engine.

For example, assuming that the printer engine has a resolution of 600 dpi, the raster process and printing of 600 dpi are executed in case of the print job printing of a text and graphics in which an edge quality is needed, and the printer driver executes the raster process at 300 dpi in case of the print job of image data in which a gradation expression is necessary, thereby enabling a gradation expression to be executed every block of (2×2) dots of the printer engine. In this instance, although a raster-unit resolution can be switched every print job by the user interface 901, since the processing resolution and a rasterization bit length are fixed every print job, they cannot be switched in the job.

However, in the printer driver which is assembled in the above conventional data processing apparatus, in the case where a composite document including text, graphics, and image in the same page is printed, in order to obtain a high precision image output, it is necessary to process at a high resolution. There is, consequently, the following problems.

That is, when the composite document including text, graphics, and image is printed and an image forming process is executed at a high resolution, it takes a time for the image process, so that the print processing time is long.

Therefore, in order to reduce the print processing time, the process can be executed by setting the resolution of the data to be rasterized to a normal resolution (about ½ of the maximum resolution on the printer side). However, even if an image is processed at a normal resolution, in case of forming an image on the printer side, a priority is given to gradation and a problem is small.

However, according to the process at the normal resolution, a deterioration in image quality of text/graphics cannot be avoided and only a print result in which a jaggy of text/graphics is conspicuous is derived.

As mentioned above, in case of print processing a page in which drawing objects of different attributes mixedly exist in the same page, there is a problem such that it is impossible to satisfy a requirement of the user such that he wants to obtain an image with good gradation and to obtain text/graphics at a high resolution.

In the foregoing conventional apparatus, the data formed by various applications is constructed by a plurality of drawing objects in the same print job and each object has an attribute of any one of the image, graphics, and text. In this case, the apparatus is designed in a manner such that the drawing objects are rendered at the same resolution in the same job and its expressing means (color converting process, rendering resolution, dot pattern formation) is preferably balanced even in any object attribute.

The conventional apparatus, however, has the following problems (1) to (3).

(1) If the whole print job is rasterized at a high resolution in order to keep a quality of text, the rasterizing process itself requires a time for a color converting process and a use amount of a memory increases.

(2) When the raster process is executed at a low resolution while importance is preferentially paid to a processing speed and a gradation, an edge quality deteriorates and a jaggy is conspicuous in the text or the like.

(3) There are two kinds of drawing objects of a drawing object in which important is paid to the resolution (text, graphics) and a drawing object in which a priority is given to the gradation (color expression). In case of the print job in which those objects mixedly exist, it is difficult to reconcile its expressing quality and a processing speed.

SUMMARY OF THE INVENTION

The present invention is made to solve the above problems and it is an object of the invention to provide a printer control apparatus and printer control method in which in case of printing a composite document including a text, graphics, and an image in a same page, attributes of drawing objects received from a drawing control system are analyzed and a resolution processing of each drawing object is switched on an object unit basis or on a page unit basis, so that a printer can print at a high speed from drawing data including each drawing object of image, text, and graphics in the same page, and print information in which a picture quality hardly deteriorates can be formed, and to also provide a memory medium in which programs which can be read out by a computer have been stored.

The invention is made to solve the above problems and it is an object of the invention to provide a printer control apparatus and printer control method in which by switching a resolution processing of a printer driver in accordance with an attribute of a drawing object of each page in print data, the resolution processing which is optimum to the attribute of the drawing object of each page is executed by the printer driver, and an image output in which a gradation function on the printer side can be most effectively used and a high quality output of a character, a figure, or the like can be reconciled, and to also provide a memory medium in which programs which can be read out by a computer have been stored.

According to the invention, there is provided a printer control apparatus for discriminating each drawing object in print data which is formed by a data processing apparatus and for forming print control information which can be analyzed by a printer, comprising: a plurality of drawing processing means for rasterizing at different resolutions on the basis of the drawing objects in the print data which is formed by the data processing apparatus; and discriminating means for discriminating attributes of the drawing objects in the print data which is formed by the data processing apparatus and for discriminating a kind of resolution processing of each drawing object, wherein any one of the drawing processing means is selected every drawing object on the basis of the discrimination result of the discriminating means and a resolution processing is switched.

According to the invention, any one of the drawing processing means has a high resolution mode to rasterize the drawing object at the maximum resolution at which the printer can perform a drawing process.

According to the invention, any one of the drawing processing means has a normal resolution mode to rasterize the drawing object at a resolution lower than the maximum resolution at which the printer can perform a drawing process.

According to the invention, when the discriminating means determines that the attribute of the drawing object in the print data which is formed by the data processing apparatus indicates bit map data, any one of the drawing processing means rasterizes the drawing object in the normal resolution mode.

According to the invention, when the discriminating means determines that the attribute of the drawing object in the print data which is formed by the data processing apparatus indicates vector data (e.g. text or graphics), any one of the drawing processing means rasterizes the drawing object in the high resolution mode.

According to the invention, when any one of the drawing processing means rasterizes the drawing object in the normal resolution mode, a predetermined high resolution modifying process is executed to the rasterized data.

According to the invention, when each drawing processing means rasterizes the drawing object in the normal resolution mode or high resolution mode, print data to be transferred to the printer is formed on the basis of the rasterized data in which each rasterized data is added.

According to the invention, there is provided a printer control apparatus for discriminating each drawing object in print data which is formed by a data processing apparatus and for forming print control information which can be analyzed by a printer, comprising: a plurality of drawing processing means for rasterizing at different resolutions on the basis of the drawing objects in the print data which is formed by the data processing apparatus; and discriminating means for discriminating attributes of the drawing objects in the print data obtained from the data processing apparatus on a page unit basis and for discriminating a kind of resolution processing every page, wherein any one of the drawing processing means is selected every page on the basis of the discrimination result of the discriminating means and a resolution processing is switched.

According to the invention, any one of the drawing processing means has a high resolution mode to rasterize the drawing object at the maximum resolution at which the printer can perform a drawing process.

According to the invention, any one of the drawing processing means has a normal resolution mode to rasterize the drawing object at a resolution lower than the maximum resolution at which the printer can perform a drawing process.

According to the invention, when the discriminating means determines that the attribute of the drawing object in the print data which is formed by the data processing apparatus indicates bit map data, any one of the drawing processing means rasterizes all of the drawing objects in the same page in the normal resolution mode.

According to the invention, when the discriminating means determines that the attribute of the drawing object in the print data which is formed by the data processing apparatus indicates vector data (e.g. text or graphics), any one of the drawing processing means rasterizes all of the drawing objects in the same page in the high resolution mode.

According to the invention, when any one of the drawing processing means rasterizes the drawing object in the normal resolution mode, a predetermined high resolution modifying process is executed to the rasterized data.

According to the invention, when each drawing processing means rasterizes the drawing object in the normal resolution mode or high resolution mode, print data to be transferred to the printer is individually formed on the basis of each rasterized data.

According to the invention, there is provided a printer control method of discriminating each drawing object in print data which is formed by a data processing apparatus and forming print control information which can be analyzed by a printer, comprising: a discriminating step of discriminating attributes of the drawing objects in the print data which is formed by the data processing apparatus and discriminating a kind of resolution processing of each drawing object; and a drawing step of drawing each drawing object at a different resolution every drawing object on the basis of the discrimination result.

According to the invention, there is provided a printer control method of discriminating each drawing object in print data which is formed by a data processing apparatus and forming print control information which can be analyzed by a printer, comprising: a discriminating step of discriminating, on a page unit basis, attributes of the drawing objects in the print data which is formed by the data processing apparatus and discriminating a kind of resolution processing of each drawing object; and a drawing step of drawing each drawing object at a different resolution every page on the basis of the discrimination result.

According to the invention, there is provided a memory medium in which a program which is used in a computer for discriminating each drawing object in print data which is formed by a data processing apparatus and for forming print control information which can be analyzed by a printer has been stored, wherein a program which includes a discriminating step of discriminating attributes of the drawing objects in the print data which is formed by the data processing apparatus and discriminating a kind of resolution processing of each drawing object and a drawing step of drawing each drawing object at a different resolution every drawing object on the basis of the discrimination result and which can be read by the computer has been stored in the memory medium.

According to the invention, there is provided a memory medium in which a program which is used in a computer for discriminating each drawing object in print data which is formed by a data processing apparatus and for forming print control information which can be analyzed by a printer has been stored, wherein a program which includes a discriminating step of discriminating, on a page unit basis, attributes of the drawing objects in the print data which is formed by the data processing apparatus and discriminating a kind of resolution processing of each drawing object and a drawing step of drawing each drawing object at a different resolution every page on the basis of the discrimination result and which can be read by the computer has been stored in the memory medium.

According to the invention, there is provided a printer control apparatus for inputting print data including a drawing object of a different attribute from a predetermined application program and for converting the print data into print control information of a different resolution which can be processed by a printer, comprising: detecting means for analyzing the print data and detecting the attribute of the drawing object of each page; and control means for switching a resolution mode to draw every page on the basis of the attribute detected by the detecting means.

According to the invention, when the detecting means detects a raster image object as a drawing object, the control means switches the resolution mode to draw to a normal resolution mode.

According to the invention, when the detecting means detects an object, as a drawing object, other than a raster image object, the control means switches the resolution mode to draw to a high resolution mode.

According to the invention, there is provided a printer control apparatus for inputting print data including a drawing object of a different attribute from a predetermined application program and for converting the print data into print control information of a different resolution which can be processed by a printer, comprising: accumulating means for analyzing the print data and for accumulating areas of rasterized image objects of respective pages; discriminating means for discriminating whether the area value of the rasterized image objects accumulated by the accumulating means exceeds a predetermined threshold value or not; and control means for switching a resolution mode to draw every page on the basis of the discrimination result of the discriminating means.

According to the invention, there is provided a printer control apparatus for inputting print data including a drawing object of a different attribute from a predetermined application program and for converting the print data into print control information of a different resolution which can be processed by a printer, comprising: accumulating means for analyzing the print data and for accumulating areas of rasterized image objects of respective pages; area discriminating means for discriminating whether the area value of the rasterized image objects accumulated by the accumulating means exceeds a predetermined threshold value or not; color discriminating means for analyzing the print data and discriminating whether a print color of the rasterized image object of each page is a color other than a specific color or not; and control means for switching a resolution mode to draw every page on the basis of the discrimination result of each of the area discriminating means and the color discriminating means.

According to the invention, the specific color is the same as a developing color of the printer.

According to the invention, when the resolution mode is switched to the high resolution mode, the control means sets a bit length of each pixel of the raster process to a short length.

According to the invention, there is provided a printer control method of inputting print data including a drawing object of a different attribute from a predetermined application program and converting the print data into print control information of a different resolution which can be processed by a printer, comprising: a detecting step of analyzing the print data and detecting the attribute of the drawing object of each page; and a switching step of switching a resolution mode to draw every page on the basis of the detected attribute.

According to the invention, there is provided a memory medium in which a program which can be read out by a computer for inputting print data including a drawing object of a different attribute from a predetermined application program and for converting the print data into print control information of a different resolution which can be processed by a printer has been stored, wherein a program which includes a detecting step of analyzing the print data and detecting the attribute of the drawing object of each page and a switching step of switching a resolution mode to draw every page on the basis of the detected attribute and which can be read by the computer has been stored in the memory medium.

According to the invention, there is provided a printer control method of inputting print data including a drawing object of a different attribute from a predetermined application program and converting the print data into print control information of a different resolution which can be processed by a printer, comprising: an accumulating step of analyzing the print data and accumulating areas of rasterized image objects of respective pages; a discriminating step of discriminating whether the accumulated area value of the rasterized image objects exceeds a predetermined threshold value or not; and a switching step of switching a resolution mode to draw every page on the basis of the discrimination result.

According to the invention, there is provided a memory medium in which a program which can be read out by a computer for inputting print data including a drawing object of a different attribute from a predetermined application program and for converting the print data into print control information of a different resolution which can be processed by a printer has been stored, wherein a program which includes an accumulating step of analyzing the print data and accumulating areas of rasterized image objects of respective pages, a discriminating step of discriminating whether the accumulated area value of the rasterized image objects exceeds a predetermined threshold value or not, and a switching step of switching a resolution mode to draw every page on the basis of the discrimination result and which can be read by the computer has been stored in the memory medium.

According to the invention, there is provided a printer control method of inputting print data including a drawing object of a different attribute from a predetermined application program and converting the print data into print control information of a different resolution which can be processed by a printer, comprising: an accumulating step of analyzing the print data and accumulating areas of rasterized image objects of respective pages; a first discriminating step of discriminating whether the accumulated area value of the rasterized image objects exceeds a predetermined threshold value or not; a second discriminating step of analyzing the print data and discriminating whether a print color of the rasterized image object of each page is a color other than a specific color or not; and a switching step of switching a resolution mode to draw every page on the basis of the discrimination result of each of the first and second discriminating steps.

According to the invention, there is provided a memory medium in which a program which can be read out by a computer for inputting print data including a drawing object of a different attribute from a predetermined application program and for converting the print data into print control information of a different resolution which can be processed by a printer has been stored, wherein: a program which includes an accumulating step of analyzing the print data and accumulating areas of rasterized image objects of respective pages, a first discriminating step of discriminating whether the accumulated area value of the rasterized image objects exceeds a predetermined threshold value or not, a second discriminating step of analyzing the print data and discriminating whether a print color of the rasterized image object of each page is a color other than a specific color or not, and a switching step of switching a resolution mode to draw every page on the basis of the discrimination result of each of the first and second discriminating steps and which can be read by the computer has been stored in the memory medium.

BRIEF DESCRIPTION OF THE DRAWINGS

FIG. 5 is a diagram for explaining a memory map of a memory medium for storing various data processing programs which can be read out by a printing system to which the invention can be applied;

FIG. 14 is a diagram for explaining a memory map of a memory medium for storing various data processing programs which can be read out by a data processing system according to the invention.

DETAILED DESCRIPTION OF THE PREFERRED EMBODIMENTS

In the embodiment, a high resolution and an ordinary resolution (hereinafter, referred to as a normal resolution) are defined as follows hereinbelow. The high resolution is set to the highest resolution at which a printer can print and the normal resolution is set to the resolution of ½ of the highest resolution.

First Embodiment

The embodiment is characterized in that a resolution processing in a printer driver is individually switched on an object unit basis such as text, figure (hereinafter, referred to as graphics), image, or the like.

Figure 1:
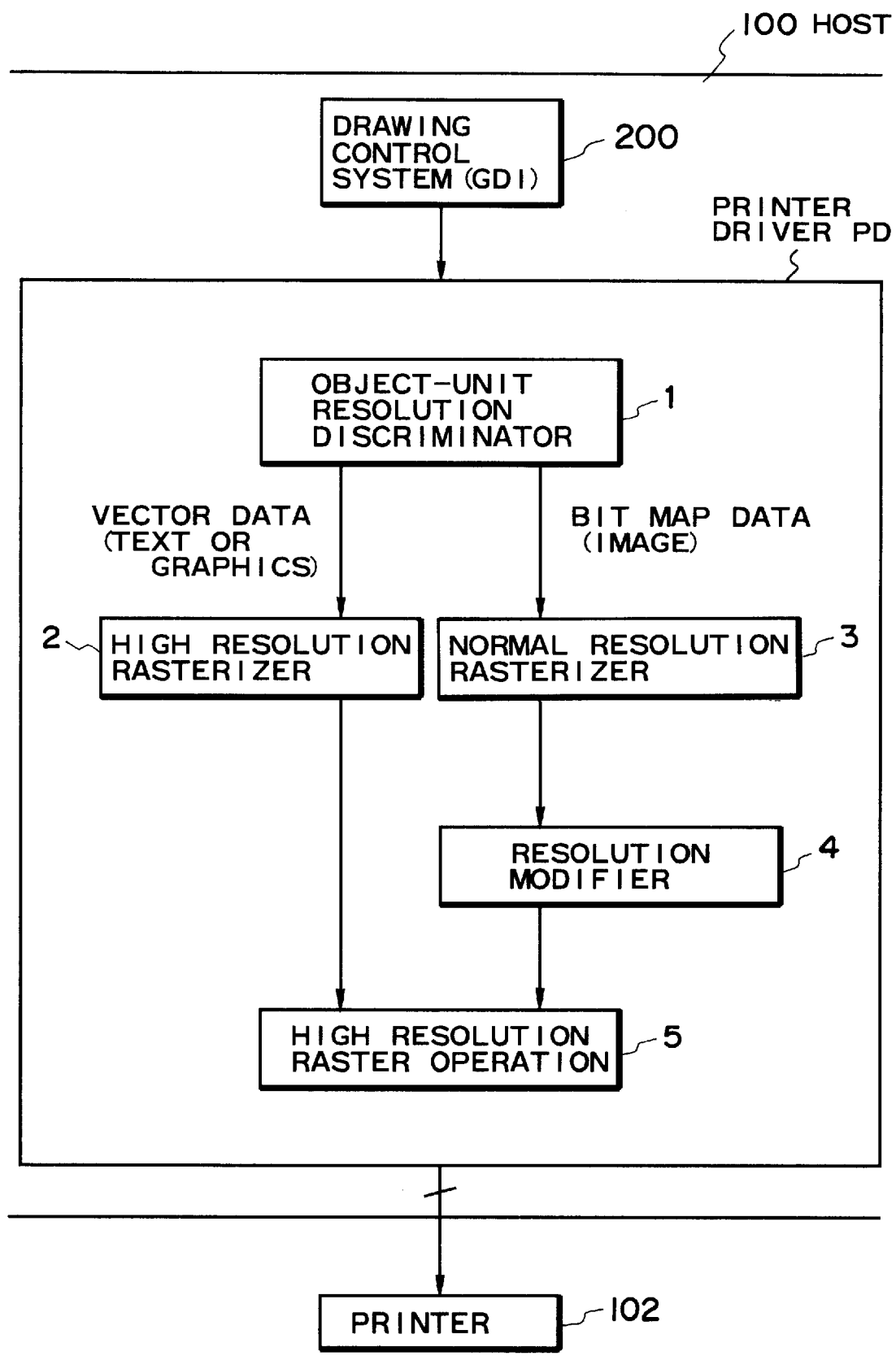
FIG. 1 is a block diagram for explaining a construction of a printer driver showing the first embodiment of the invention.

FIG. 1 is a block diagram for explaining a construction of the printer driver showing the first embodiment of the invention and corresponds to a case of processing when the resolution processing is switched on an object unit basis.

In the diagram, reference numeral 1 denotes an object-unit resolution discriminator for obtaining a drawing object from a drawing control system (for instance, GDI) 200 in the host 100 and discriminates a processing resolution of the obtained drawing object as will be explained hereinlater.

In the text/graphics and image, the kinds of data which is transmitted from the drawing control system (for example, GDI or the like) to a printer driver PD are different as follows.

That is, the text/graphics is data of a vector system and the image is data of a bit map system. Therefore, the processing resolution is determined by the object-unit resolution discriminator 1 on the basis of the kind of data that is transmitted from the drawing control system to the printer driver PD.

Specifically speaking, when the text/graphics data of the vector system is transmitted from the drawing control system 200 to the printer driver PD, the processing mode is determined to be the high resolution processing. When the image data of the bit map system is transmitted, the processing mode is decided to be the normal resolution processing.

Data processes after the resolution processing was switched by the object-unit resolution discriminator 1 will now be described hereinbelow.

When the text/graphics data of the vector system is transmitted, the text/graphics data of the vector system is supplied to a high resolution rasterizer 2 and a high resolution rasterization is executed.

On the other hand, when the image data of the bit map system is transmitted, it is supplied to a normal resolution rasterizer 3 and a normal resolution rasterization is executed.

The data which was rasterized to the normal resolution by the normal resolution rasterizer 3 is subjected to a smoothing or 0th-order interpolating process by a resolution modifier 4 and is resolution converted, thereby converting into a high resolution. The data formed by the high resolution rasterizer 2 and the data formed by the resolution modifier 4 are added and a high resolution raster operation is executed by a high resolution raster operation 5. A high resolution output image is formed in this manner and is transferred as print data to the printer 102 through a predetermined interface.

Thus, a different optimum resolution processing is executed every drawing object. In case of the text/graphics data, print information without any jaggy can be transferred to the printer 102. In case of the image data, print information of a high gradation can be transferred to the printer 102.

A correspondence between the embodiment and each means of the invention and its operation will now be described hereinbelow with reference to FIG. 1.

According to the invention, there is provided a printer control apparatus (printer driver PD) for discriminating each drawing object in print data which is formed by a data processing apparatus (host 100) and forming print control information which can be analyzed by the printer, comprising: a plurality of drawing processing means (high resolution rasterizer 2, normal resolution rasterizer 3) for rasterizing at different resolutions on the basis of the drawing objects in the print data which is formed by the data processing apparatus; and discriminating means (object-unit resolution discriminator 1) for discriminating attributes of the drawing objects in the print data which is formed by the data processing apparatus and for discriminating a kind of resolution processing of each drawing object, wherein the object-unit resolution discriminator 1 discriminates the attributes of the drawing objects in the print data which is formed by the host 100 and discriminates the kind of resolution processing of each drawing object, the high resolution rasterizer 2 or normal resolution rasterizer 3 is selected every drawing object on the basis of the discrimination result and the resolution processing is switched. Thus, even if the drawing objects of different attributes are included in the same page, each drawing object can be rasterized while switching the resolution processing to the optimum resolution processing.

According to the invention, when the object-unit resolution discriminator 1 discriminates that the attribute of the drawing object in the print data which is formed by the host 100 indicates the text/graphics data, the high resolution rasterizer 2 rasterizes the drawing object in the high resolution mode, so that the rasterizing process in which a priority is given to the resolution can be performed to each drawing object serving as text/graphics data.

According to the invention, when the object-unit resolution discriminator 1 discriminates that the attribute of the drawing object in the print data which is formed by the host 100 indicates the bit map data, the normal resolution rasterizer 3 rasterizes the drawing object in the normal resolution mode serving as a resolution lower than the maximum resolution at which the printer can perform the drawing process. Therefore, the rasterizing process in which the resolution is low and importance is preferentially paid to the processing speed and gradation can be efficiently performed to each drawing object serving as bit map data.

According to the invention, when the normal resolution rasterizer 3 rasterizes the drawing object in the normal resolution mode, a predetermined high resolution modifying process (resolution modifier 4) is executed to the rasterized data. Therefore, print information such that the image data having excellent gradation can be printed by the printer of a high resolution can be formed in a short time.

According to the invention, when each drawing processing means rasterizes the drawing object in the normal resolution mode or high resolution mode, the print data to be transferred to the printer is formed (high resolution raster operation 5) on the basis of the rasterized data obtained by adding each rasterized data. Therefore, print information such that even a page in which the drawing objects of different attributes complicatedly mixedly exist can be continuously drawn can be formed.

Figure 2:
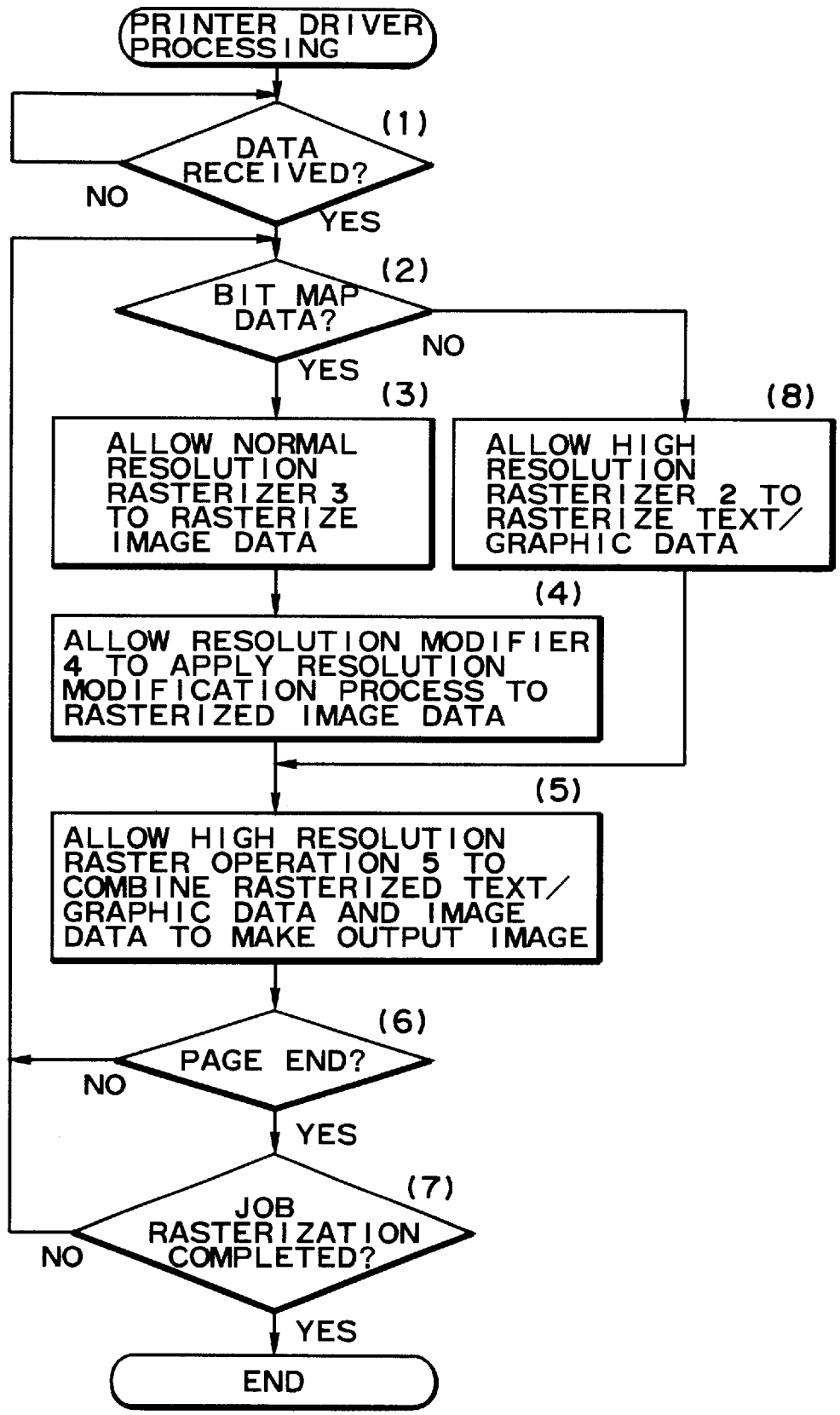
FIG. 2 is a flowchart showing an example of a first data processing procedure by the printer driver according to the invention.

FIG. 2 is a flowchart showing an example of a first data processing procedure by a printer driver according to the invention. Reference numerals (1) to (8) denote processing steps, respectively.

First, when the data of the drawing object is received from the drawing control system 200 (1), the object-unit resolution discriminator 1 discriminates whether the attribute indicates the data of the bit map system or not (2). If YES, the normal resolution rasterizer 3 rasterizes the image data (3). The resolution modifier 4 executes a smoothing process or a 0th-order interpolating process to the rasterized image data (4). The high resolution raster operation 5 forms an output image by combining the data of the text/graphics system and the data of the image system which were rasterized (5).

Subsequently, a check is made to see if the drawing object has been rasterized up to the page end (6). If NO, the processing routine is returned to step (2) and similar processes are repeated. If YES, a check is made to see if the rasterization of the job has been completed (7). If NO, the processing routine is returned to step (2) and similar processes are repeated. If YES, the processing routine is finished.

When it is determined in step (2) that the attribute of the drawing object of the received data indicates the text/graphics system, the high resolution rasterizer 2 rasterizes the text/graphics data (8). The processing routine is returned to step (5).

A correspondence between the embodiment and each processing step of the invention and its operation will now be described hereinbelow with reference to FIG. 2 and the like.

According to the invention, there is provided a print control method of discriminating each drawing object in print data which is formed by a data processing apparatus (host 100) and forming print control information which can be analyzed by a printer, comprising: a discriminating step [steps (1) and (2) in FIG. 2] of discriminating attributes of the drawing objects in the print data which is formed by the data processing apparatus and discriminating a kind of resolution processing of each drawing object; and a drawing step [steps (3) and (8) in FIG. 2] of drawing each drawing object at a different resolution every drawing object on the basis of the discrimination result, wherein a CPU (not shown) of the host 100 executes a control program stored in an ROM or another memory resource and even if drawing objects of different attributes are included in the same page, each drawing object can be rasterized while switching to the optimum resolution processing.

According to the invention, there is provided a memory medium in which a program which is used by a computer for discriminating each drawing object in print data that is formed by a data processing apparatus and for forming print control information that can be analyzed by a printer has been stored, wherein a program which includes a discriminating step [steps (1) and (2) in FIG. 2] of discriminating attributes of the drawing objects in the print data which is formed by the data processing apparatus and discriminating a kind of resolution processing of each drawing object and a drawing step [steps (3) and (8) in FIG. 2] of drawing each drawing object at a different resolution every drawing object on the basis of the discrimination result and which can be read by the computer has been stored in the memory medium. That is, a form such that program codes corresponding to the processing steps shown in FIG. 2 are stored into a memory resource (not shown) of the host 100 and the CPU of the host 100 reads out the program codes from the memory medium in which the program codes have been stored and executes them is also included in the embodiment of the invention.

Second Embodiment

Although the control of switching the resolution processing every drawing object has been described in the above embodiment, the resolution processing can be also switched on a page unit basis. Such an embodiment will now be described hereinbelow.

Figure 3:
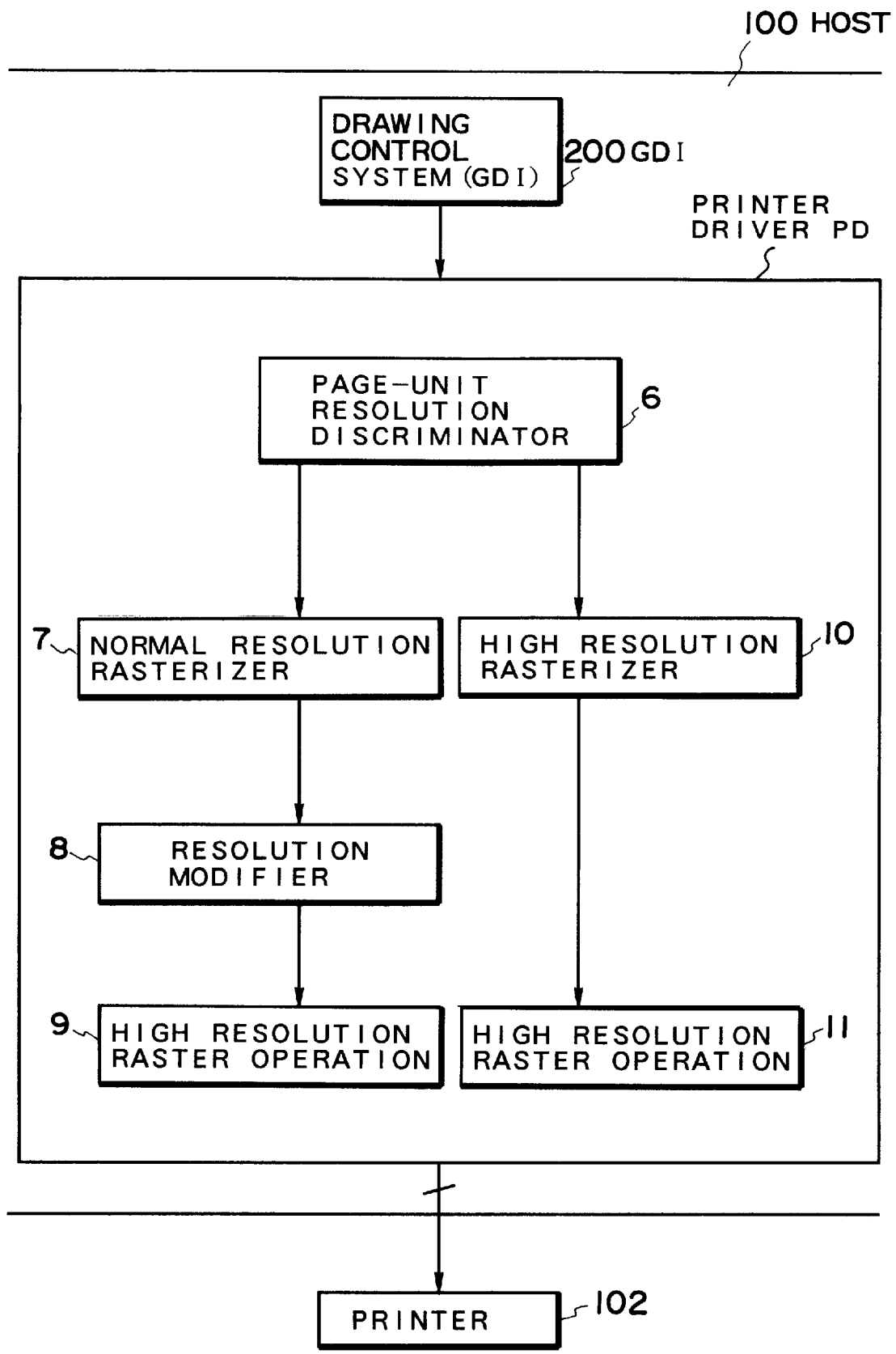
FIG. 3 is a block diagram for explaining a construction of a printer driver showing the second embodiment of the invention.

FIG. 3 is a block diagram for explaining a construction of a printer driver showing the second embodiment of the invention and corresponds to the case of switching the resolution processing on a page unit basis.

In the diagram, reference numeral 6 denotes a page-unit resolution discriminator. When data of one page is transmitted from the drawing control system 200 (for example, GDI) to the printer driver PD, the page-unit resolution discriminator 6 discriminates whether data of the bit map system of an image exists in the data or not and determines a page-unit resolution on the basis of the discrimination result as follows.

That is, when the data of one page is transmitted to the printer driver PD from the drawing control system 200 of the host 100 (not shown), if the data of the bit map system exists in the data of one page, it is determined that the normal resolution processing should be performed. When the data of the bit map system does not exist in the data of one page, it is decided that the high resolution processing should be executed.

Thus, the normal resolution processing is executed to a page including an image and the high resolution processing is executed to a page of only text/graphics data in which no image is included in the page.

A case of performing the normal resolution processing to the page in which an image is included will now be described hereinbelow.

The data of the page including the image is transmitted to a normal resolution rasterizer 7 and a normal resolution rasterization is executed. The data which was rasterized in the normal resolution rasterizer 7 is smoothed by a resolution modifier 8, thereby modifying to a high resolution. By realizing the high resolution, a jaggy of text/graphics included in the page is made inconspicuous. A high resolution raster operation 9 executes a raster operation to the data smoothed by the resolution modifier 8. After the output image of the page including the image was formed as mentioned above, it is transferred to the printer 102.

A case of executing the high resolution processing to a page of only text/graphics in which no image is included will now be described.

The data of the page of only text/graphics is transmitted to a high resolution rasterizer 10 and a high resolution rasterization is executed. The data which was high resolution rasterized by the high resolution rasterizer 10 is subjected to a raster operation by a high resolution raster operation 11 and an output image of a high resolution is formed. After that, it is transferred to the printer 102.

The resolution processing is switched on a page unit basis and an output image is formed.

A correspondence between the embodiment and each means of the invention and its operation will now be described hereinbelow with reference to FIG. 1.

According to the invention, there is provided a printer control apparatus (printer driver PD) for discriminating each drawing object in print data which is formed by a data processing apparatus (host 100) and for forming print control information which can be analyzed by a printer, comprising: a plurality of drawing processing means (high resolution rasterizer 10, normal resolution rasterizer 7) for rasterizing at different resolutions on the basis of drawing objects in print data which is formed by the data processing apparatus; and discriminating means (page-unit resolution discriminator 6) for discriminating attributes of the drawing objects in the print data which is obtained from the data processing apparatus on a page unit basis and for discriminating a kind of resolution processing every page, wherein the page-unit resolution discriminator 6 discriminates the attributes of the drawing objects in the print data which is obtained on a page unit basis from the host 100 and discriminates the kind of resolution processing every page, either one of the high resolution rasterizer 10 and the normal resolution rasterizer 7 is selected and the resolution processing is switched every page on the basis of the discrimination result, so that even if drawing objects of different attributes are included in the same page, the resolution processing of each drawing object is switched on a page unit basis and each drawing object can be rasterized.

According to the invention, when the page-unit resolution discriminator 6 discriminates that the attribute of the drawing object in the print data which is formed by the host 100 indicates text/graphics data, either one of the high resolution rasterizer 10 and normal resolution rasterizer 7 rasterizes all of the drawing objects in the same page in the high resolution mode as a maximum resolution at which the printer can perform a drawing process, so that print information such that text/graphics can be outputted at a high picture quality without any jaggy can be formed.

According to the invention, when the page-unit resolution discriminator 6 discriminates that the attribute of the drawing object in the print data which is formed by the host 100 indicates the bit map data, either one of the high resolution rasterizer 10 and normal resolution rasterizer 7 rasterizes all of the drawing objects in the same page in the normal resolution mode serving as a resolution lower than the maximum resolution at which the printer can perform a drawing process, so that when the bit map data is included in the same page, print information such that the bit map data can be outputted at a good gradation can be formed.

According to the invention, when either one of the high resolution rasterizer 10 and normal resolution rasterizer 7 rasterizes the drawing object in the normal resolution mode, a predetermined high resolution modifying process is performed to the rasterized data, so that when the bit map data is included in the same page, even if print information such that the bit map data can be outputted at a good gradation is formed, print information in which a jaggy of text/graphics or the like in the same page is inconspicuous can be formed.

According to the invention, when each of the high resolution rasterizer 10 and normal resolution rasterizer 7 rasterizes the drawing object in the normal resolution mode or high resolution mode, print data to be transferred is individually formed on the basis of each rasterized data (high resolution raster operations 9 and 11), so that the print data can be converted into the print information which can be printed by the printer at a high resolution every bit map which was drawn every drawing object.

Figure 4:
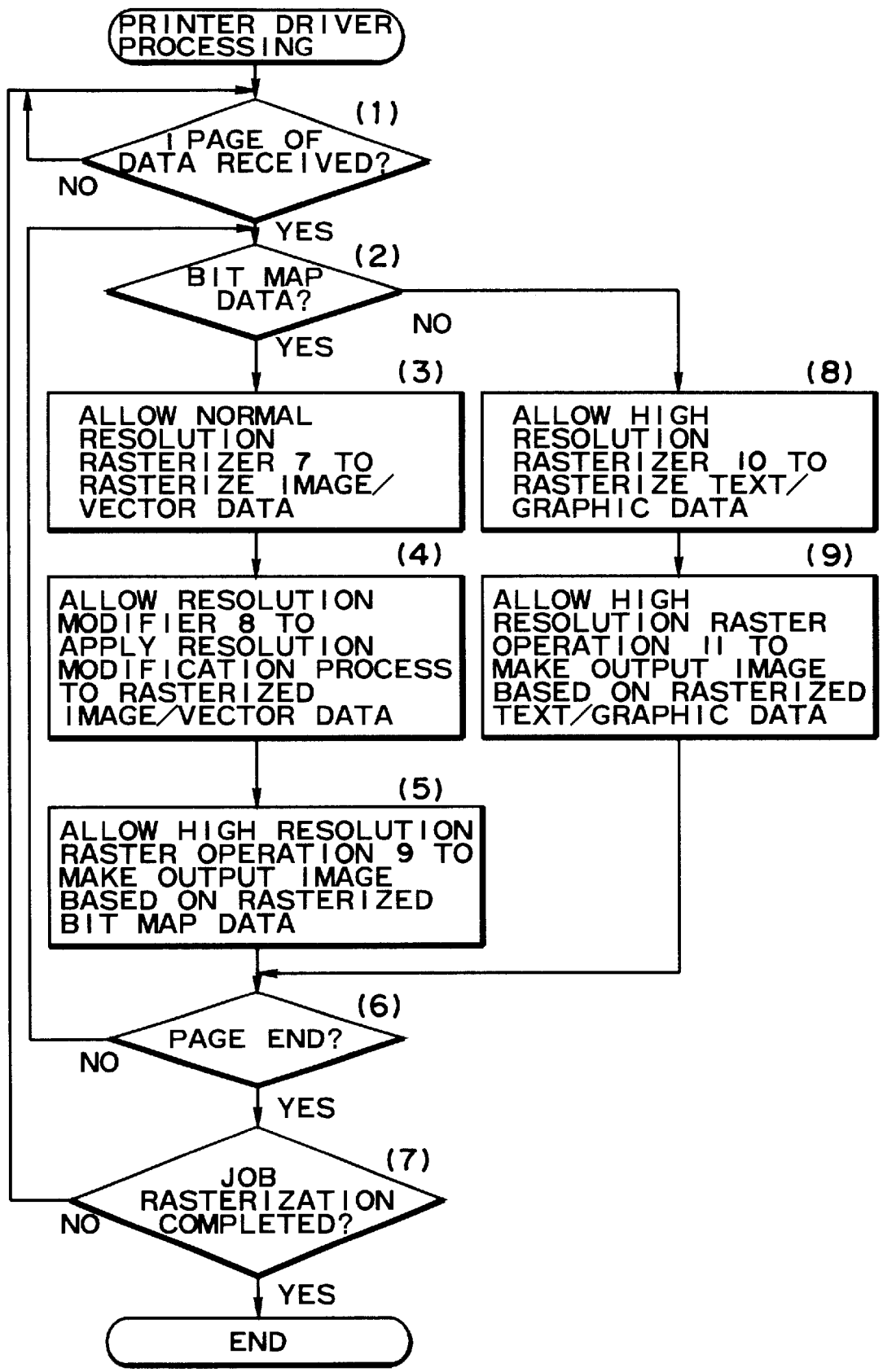
FIG. 4 is a flowchart showing an example of a second data processing procedure by the printer driver according to the invention.

FIG. 4 is a flowchart showing an example of a second data processing procedure by a printer driver according to the invention. Reference numerals (1) to (9) denote processing steps, respectively.

First, when data of one page is received from the drawing control system 200 (1), the page-unit resolution discriminator 6 discriminates whether data of a drawing object serving as data of the bit map system exists in the relevant page or not (2). If YES, the normal resolution rasterizer 7 rasterizes the image data (3). The resolution modifier 8 executes a smoothing process or 0th-order interpolating process to the rasterized image data (4). The high resolution raster operation 9 forms an output image on the basis of the rasterized data of the image system (5).

Subsequently, a check is made to see if the drawing object has been rasterized up to the page end (6). If NO, the processing routine is returned to step (2) and similar processes are repeated. If YES, a check is made to see if the rasterization of the job has been completed (7). If NO, the processing routine is returned to step (1) and the data of the next page is received. If YES, the processing routine is finished.

When it is determined in step (2) that the drawing object of the vector system exists in the received data of one page, namely, when it is determined that the data is not the data of the bit map system, the high resolution rasterizer 10 rasterizes the text/graphics data (8). The high resolution raster operation 11 forms an output image on the basis of the rasterized data of the text/graphics system (9). The processing routine is returned to step (6).

A correspondence between the embodiment and each processing step of the invention and its operation will now be described hereinbelow with reference to FIG. 2 and the like.

According to the invention, there is provided a printer control method of discriminating each drawing object in print data which is formed by a data processing apparatus (host 100) and forming print control information which can be analyzed by a printer, comprising: a discriminating step [steps (1) and (2) in FIG. 4] of discriminating attributes of the drawing objects in the print data which is formed by the data processing apparatus on a page unit basis and discriminating a kind of resolution processing of each drawing object; and a drawing step [steps (3) and (8) in FIG. 4] of drawing each drawing object at a different resolution every page on the basis of the discrimination result, wherein a CPU (not shown) of the host 100 executes a control program stored in an ROM or another memory resource and even if the drawing objects of different attributes are included in the same page, a resolution processing of each drawing object is switched on a page unit basis and each drawing object can be rasterized.

According to the invention, there is provided a memory medium in which a program which is used by a computer for discriminating each drawing object in print data which is formed by a data processing apparatus and for forming print control information that can be analyzed by a printer has been stored, wherein a program which includes a discriminating step [steps (1) and (2) in FIG. 4] of discriminating attributes of the drawing objects, on a page unit basis, in the print data which is formed by the data processing apparatus and a drawing step [steps (3) and (8) in FIG. 4] of drawing each drawing object at a different resolution every page on the basis of the discrimination result and which can be read by the computer has been stored in the memory medium. That is, a form such that program codes corresponding to the processing steps shown in FIG. 4 are stored in a memory resource (not shown) of the host 100 and the CPU of the host 100 reads out the program codes from the memory medium in which the program codes have been stored and executes them is also included in the embodiment of the invention.

A construction of a data processing program which can be read out by a printing system according to the invention will now be described hereinbelow with reference to a memory map shown in FIG. 5.

FIG. 5 is a diagram for explaining a memory map in a memory medium to store various data processing programs which can be read out by a printing system to which the invention can be applied.

Although not shown in particular, there is also a case where information for managing the programs which are stored into the memory medium, for example, version information, person who makes, and the like are also stored and information which depends on the OS or the like on the program reading side, for example, icon to identify and display the program and the like are also stored.

Further, data belonging to various programs is also managed in the directory. There is also a case where a program to install various programs into a computer, and in the case where a program to be installed has been compressed, a program to decompress it, and the like are also stored.

The functions shown in FIGS. 2 and 4 in the embodiment can be also executed by a host computer by a program that is installed from the outside. In such a case, the invention is also applied to a case where information group including a program is supplied to an output apparatus from a memory medium such as CD-ROM, flash memory, FD, or the like or from an external memory medium through a network.

It will be obviously understood that the object of the invention is accomplished by a method whereby, as mentioned above, a memory medium in which program codes of software to realize the functions of the foregoing embodiment have been recorded is supplied to a system or an apparatus and a computer (or CPU or MPU) of the system or apparatus reads out and executes the program codes stored in the memory medium.

In this case, the program codes themselves read out from the memory medium realize novel functions of the invention and the memory medium in which the program codes have been stored construct the invention.

As a memory medium to supply the program codes, for example, it is possible to use a floppy disk, a hard disk, an optical disk, a magnetooptic disk, a CD-ROM, a CD-R, a magnetic tape, a non-volatile memory card, an ROM, an EEPROM, or the like.

It will be obviously understood that not only a case where the functions of the foregoing embodiment are realized by executing the program codes read out by the computer but also a case where the OS (operating system) or the like which is running on the computer executes a part or all of the actual processes on the basis of an instruction of the program code and the functions of the foregoing embodiment are realized by those processes are included in the invention.

Further, it will be also obviously understood that a case where after the program codes read out from the memory medium were written in a memory equipped with a function expansion board inserted in the computer or with a function expansion unit connected to the computer, a CPU or the like provided for the function expansion board or function expansion unit executes a part or all of the actual processes on the basis of an instruction of the program codes and the functions of the foregoing embodiment are realized by those processes is also included in the invention.

According to the first embodiment, since the resolution processing is switched on an object unit basis, in case of printing a composite document including a text, graphics, and an image in the same page, the high resolution processing is performed for the text/graphics and the process can be executed at the normal resolution for the image. Thus, the jaggy of the text/graphics is made inconspicuous. Since the processes are executed at the normal resolution for the image, a priority is given to the gradation. Therefore, an output image of a high image quality is obtained.

According to the above second embodiment, since the resolution processing is switched on a page unit basis, in case of printing a composite document including a text, graphics, and an image in the same page, the normal resolution processing is performed for a page including the image and the high resolution processing can be executed for a page of only text/graphics including no image. In case of printing a composite document including a text, graphics, and an image in the same page, in the composite document in which the number of pages including images is large, after the processes were executed at the normal resolution for the page including the image, the resolution is modified to the high resolution, so that the printing time can be reduced without deteriorating the image quality of text/graphics.

Third Embodiment

Figure 6:
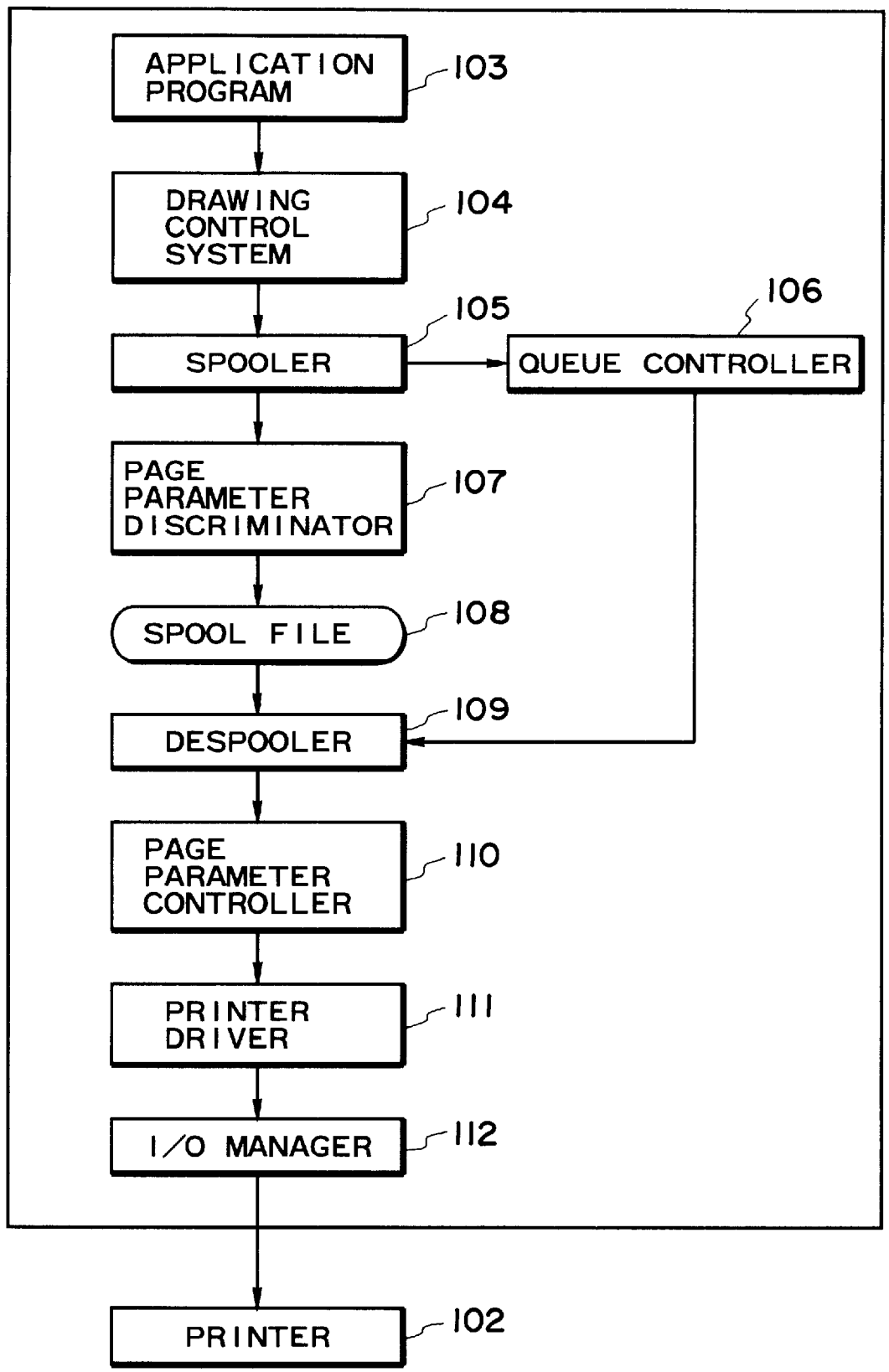
FIG. 6 is a block diagram showing an example of a data processing system to which a printer control apparatus showing the third embodiment of the invention can be applied.
Figure 15:
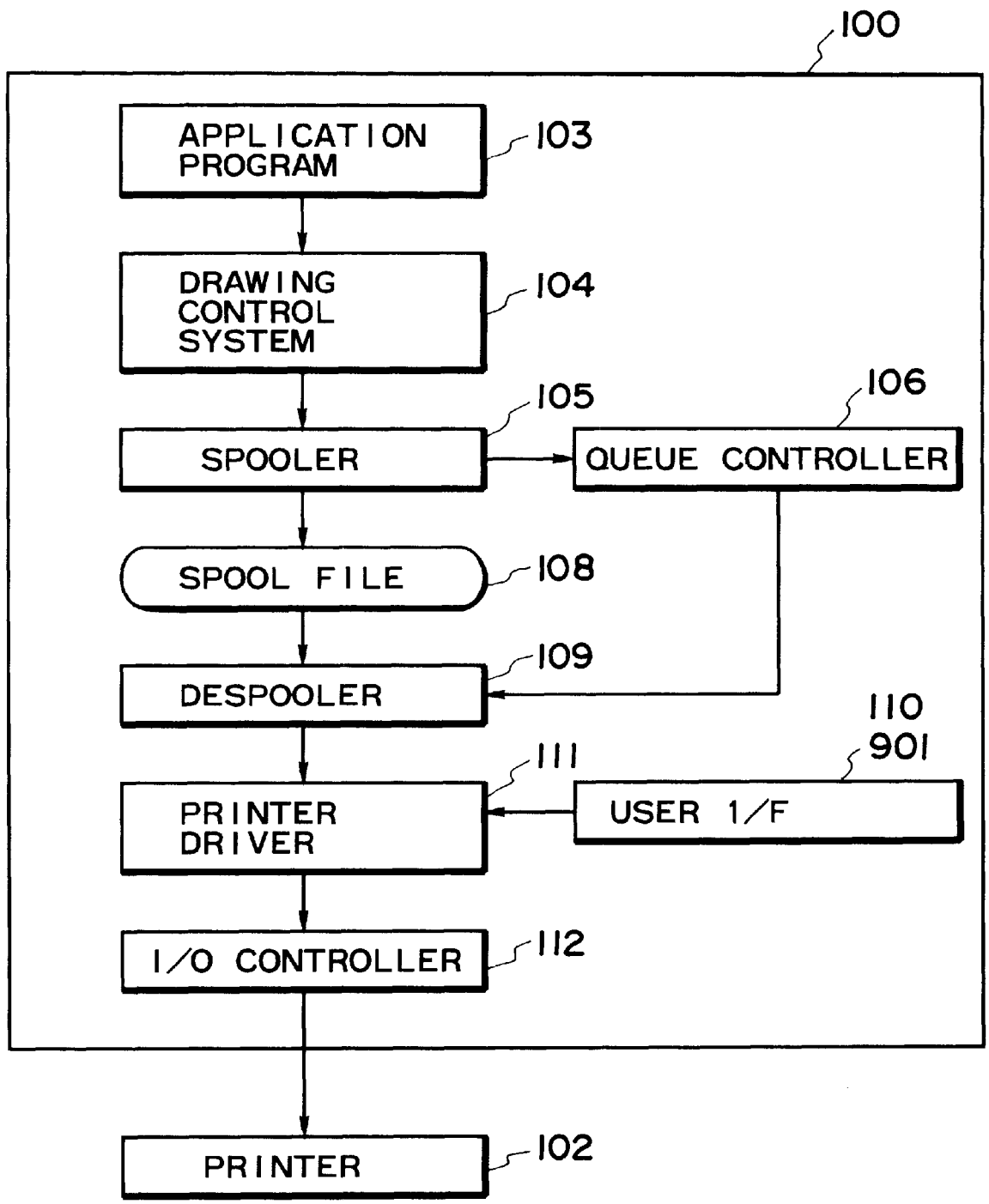
FIG. 15 is a block diagram for explaining a construction of such a kind of print control system.

FIG. 6 is a block diagram showing an example of a data processing system to which a printer control apparatus showing the third embodiment of the invention can be applied. The same component elements as those in FIG. 15 are designated by the same reference numerals and the data processing system is constructed so that the host (PC) 100, printer 102, and the like can communicate through a predetermined interface or network.

The printer 102 has a function for receiving print information and transmitting a status of a printer engine (not shown) to the host 100 by communicating with the host 100 in accordance with a predetermined protocol. As a printer engine, any one of an ink jet printer engine, a laser beam printer engine, and the like can be used. FIG. 6 is commonly used for each embodiment, which will be explained hereinlater.

In FIG. 6, the application program (application) 103 sequentially transmits the formed print job data to the drawing control system 104. The drawing control system 104 converts the print job data into a format that can be subjected to the drawing process of the printer driver 111 and supplies the converted data to the spooler 105. This data is made up of a logical drawing object and drawing control information to the printer 102. The drawing control system 104 is generally a program at a system level and, for example, in the Windows (trade name), GDI corresponds to it.

The spooler 105 sets an output of the drawing control system 104 into the spool file 108 through a page parameter discriminator 107 and notifies the queue controller 106 of a fact that the spool has been completed, thereby allowing a queueing process of the print job to be executed.

The page parameter discriminator 107 sequentially discriminates an output of the spooler 105 and stores a parameter (hereinafter, referred to as a page parameter PP) for instructing a drawing control of each page into the spool file 108.

The queue controller 106 manages an executing order of the printing process on a print job unit basis. The queue controller 106 receives a notification indicating that the print job has been set into the spool file 108 from the spooler 105 and registers the print job into a print queue. The queue controller 106 also activates the despooler 109 and allows a generation of the print job to be executed ordinarily from the head (the oldest print job) of the queue.

The despooler 109 extracts the spool file 108 of the print job instructed by the queue controller 106 and supplies it to a page parameter controller 110. In response to it, the page parameter controller 110 checks the contents of the print job, instructs the drawing every page of the job in accordance with the drawing instruction discriminated by the page parameter discriminator 107, deletes the instructed information (page parameter PP), and sequentially transmits the data of the job to the printer driver 111.

Thus, the data which is received by the printer driver 111 is the same as the data outputted from the spooler 105.

The printer driver 111 converts the logical drawing object formed by the drawing control system 104 and the drawing control information for the printer 102 into the physical drawing information and control information which can be recognized by the printer 102 and transmits the converted information to the printer 102 through the I/O controller 112. The I/O controller 112 also executes a data buffering and an I/O control for transmitting the data stream formed by the printer driver 111 to the printer 102.

Data processes of the printer driver 111 shown in FIG. 6 will now be described hereinbelow with reference to FIG. 7.

Figure 7:
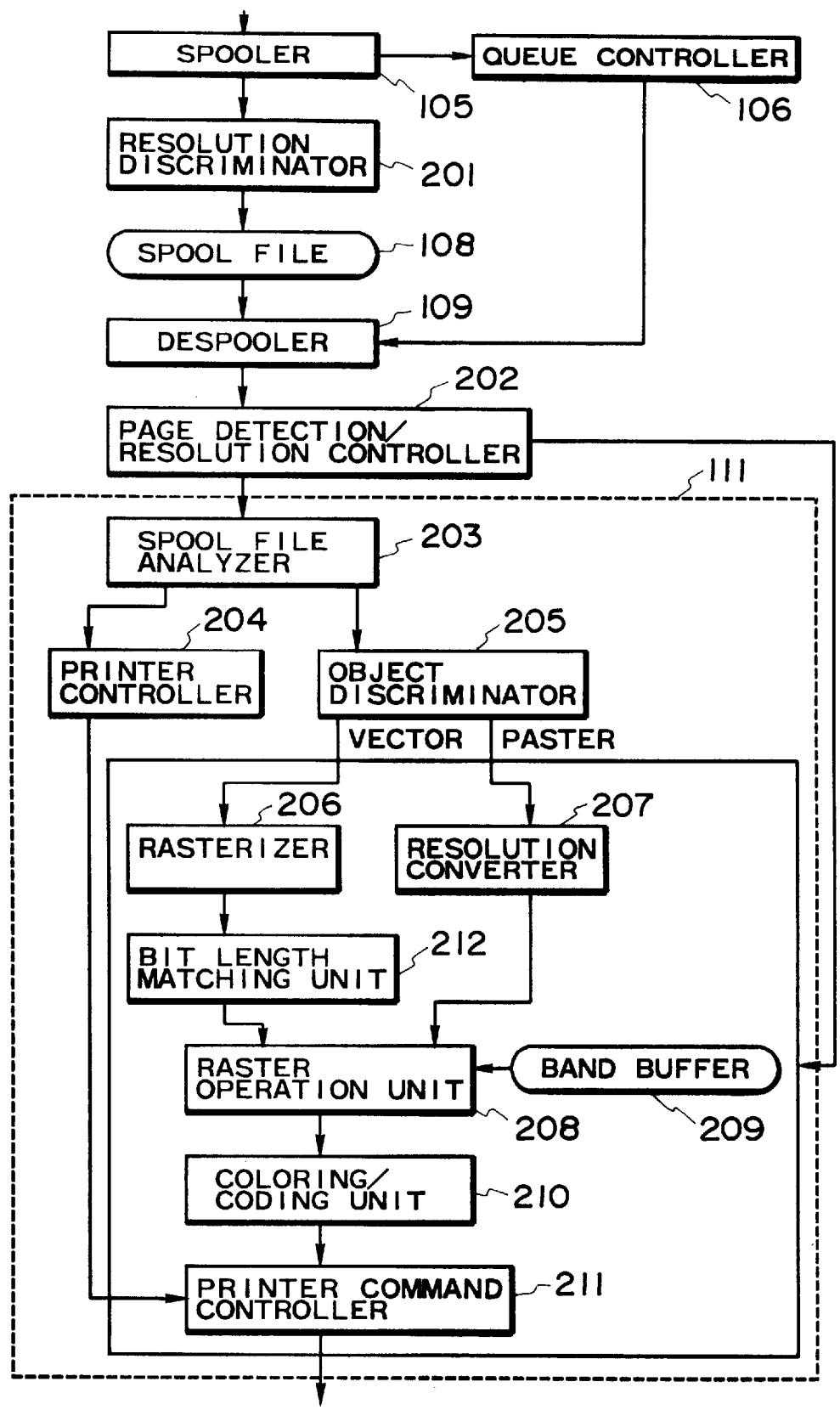
FIG. 7 is a block diagram for explaining a data processing construction around a printer driver shown in FIG. 6.

FIG. 7 is a block diagram for explaining a data processing construction around the printer driver 111 shown in FIG. 6 and the same component elements as those in FIG. 6 are designated by the same reference numerals. A spooling, a queue control, a despooling, a page parameter control, and a data process of the printer driver 111 will now be described hereinbelow with reference to FIG. 8.

Figure 8:
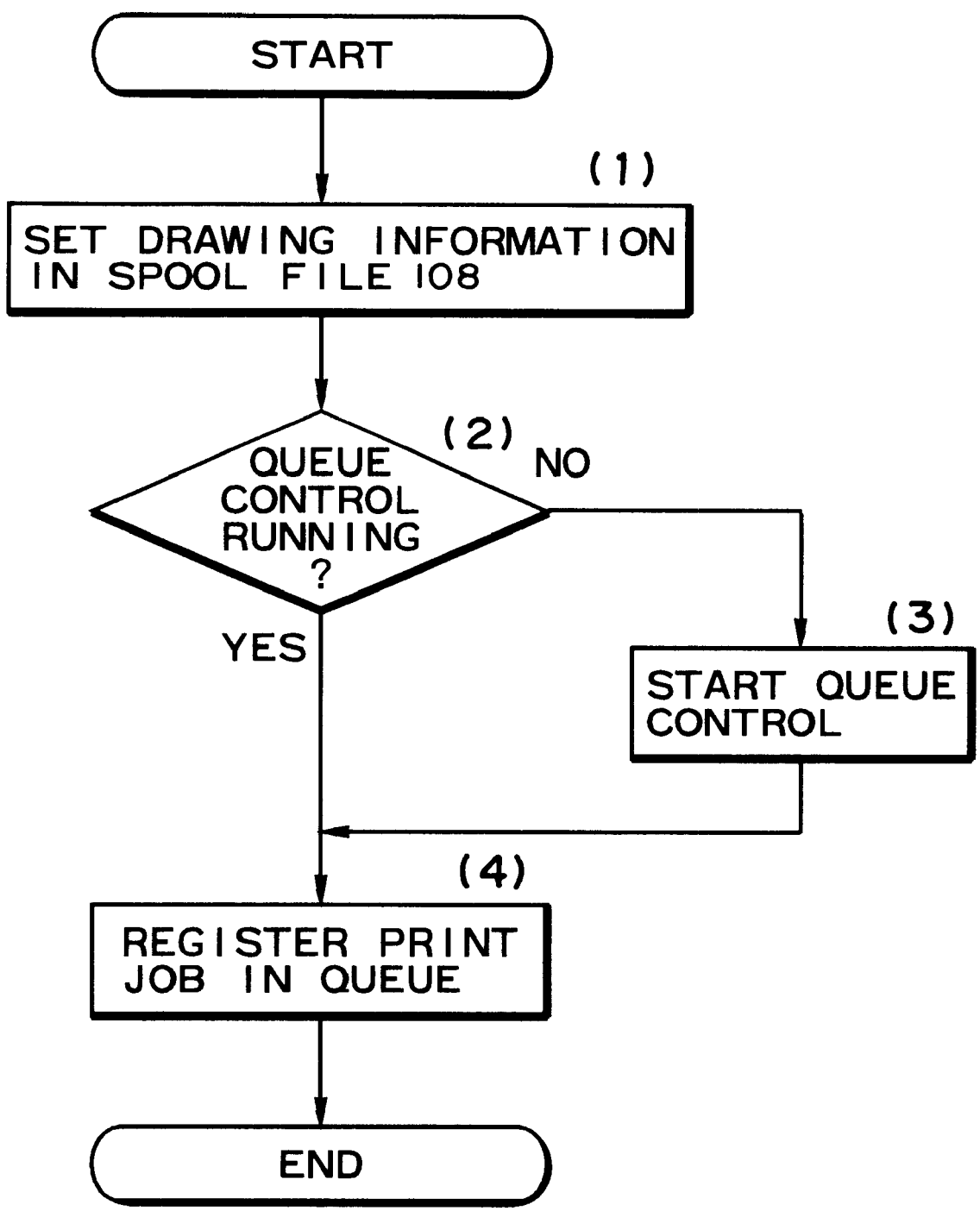
FIG. 8 is a flowchart showing an example of a data processing procedure for a spooler shown in FIG. 6.

FIG. 8 is a flowchart showing an example of a data processing procedure of the spooler 105 shown in FIG. 6. Reference numerals (1) to (4) denote processing steps, respectively.

First, the spooler 105 sets the drawing information into the spool file 108 (1). Subsequently, a check is made to see if the queue controller 106 is running (2). If NO, the queue controller 106 is activated in step (3). The processing routine advances to step (4) and subsequent steps.

When it is determined in step (2) that the queue controller 106 is running, a message indicating the completion of the setting is notified to the queue controller 106 and the print job is registered into the queue (4). The processing routine is finished. Functions and data processes of the queue controller 106, spool file 108, and despooler 109 are similar to those mentioned in FIG. 1.

Data processes in the case where the page parameter PP of the page parameter discriminator 107 shown in FIG. 6 is, for instance, a processing resolution of each page will now be explained hereinbelow.

In FIG. 7, reference numeral 201 denotes a resolution discriminator and corresponds to the specific example of the page parameter discriminator 107 shown in FIG. 6. The resolution discriminator 201 sequentially discriminates the drawing information which is transmitted from the spooler 105, discriminates the processing resolution of each page, and stores its instruction information as a page parameter PP into the spool file 108. When it is determined that the page is a gradation significant page, the page parameter PP in which the processing resolution is set to the normal resolution is stored into the spool file 108. When it is decided that the page is a resolution significant page, the page parameter PP in which the processing resolution is set to the high resolution is stored into the spool file 108. Data processes of the resolution discriminator 201 shown in FIG. 7 will now be described hereinbelow with reference to FIG. 9.

Figure 9:
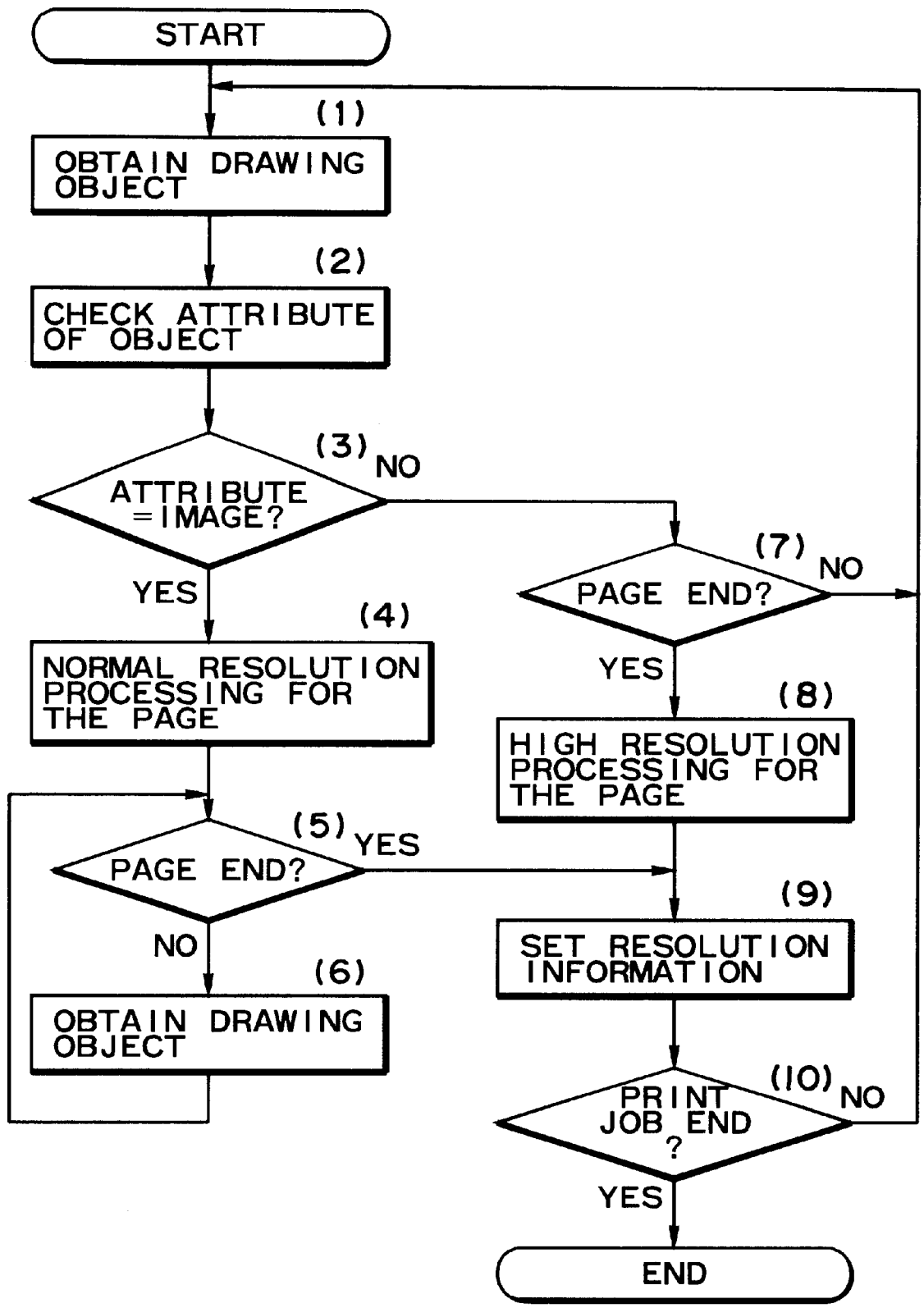
FIG. 9 is a flowchart showing an example of a first data process of a resolution discriminator shown in FIG. 7.

FIG. 9 is a flowchart showing an example of a first data process of the resolution discriminator 201 shown in FIG. 7. Reference numerals (1) to (10) denote processing steps, respectively.

The resolution discriminator 201 sequentially obtains the drawing objects from the spooler 105 (1) and discriminates their attributes (2). A check is made to see if the discriminated attribute indicates an image object (3). When it is determined that the image object was detected, the page is regarded as a "gradation significance" and the process is determined to be the normal resolution processing (4). The drawing objects are skipped up to the page end (5 and 6). When the page end is detected, the processing routine advances to step (9).

When it is determined in step (3) that no image object is detected, the attribute checking operation is continued. When reaching the page end (7), since the relevant page is constructed by only the text/graphics, it is regarded as a "resolution significance" and the process is decided to be the high resolution processing (8).

The processing resolution information (page parameter PP) is set after a page delimiter in the spool file 108 (9). Subsequently, a check is made to see if it is a print job end (10). If NO, the processing routine is returned to step (1). If YES, the processing routine is finished and advances to the discriminating process of the next page.

In FIG. 7, reference numeral 202 denotes a page detection/resolution controller corresponding to the specific example of the page parameter controller 110 shown in FIG. 6.

Figure 10:
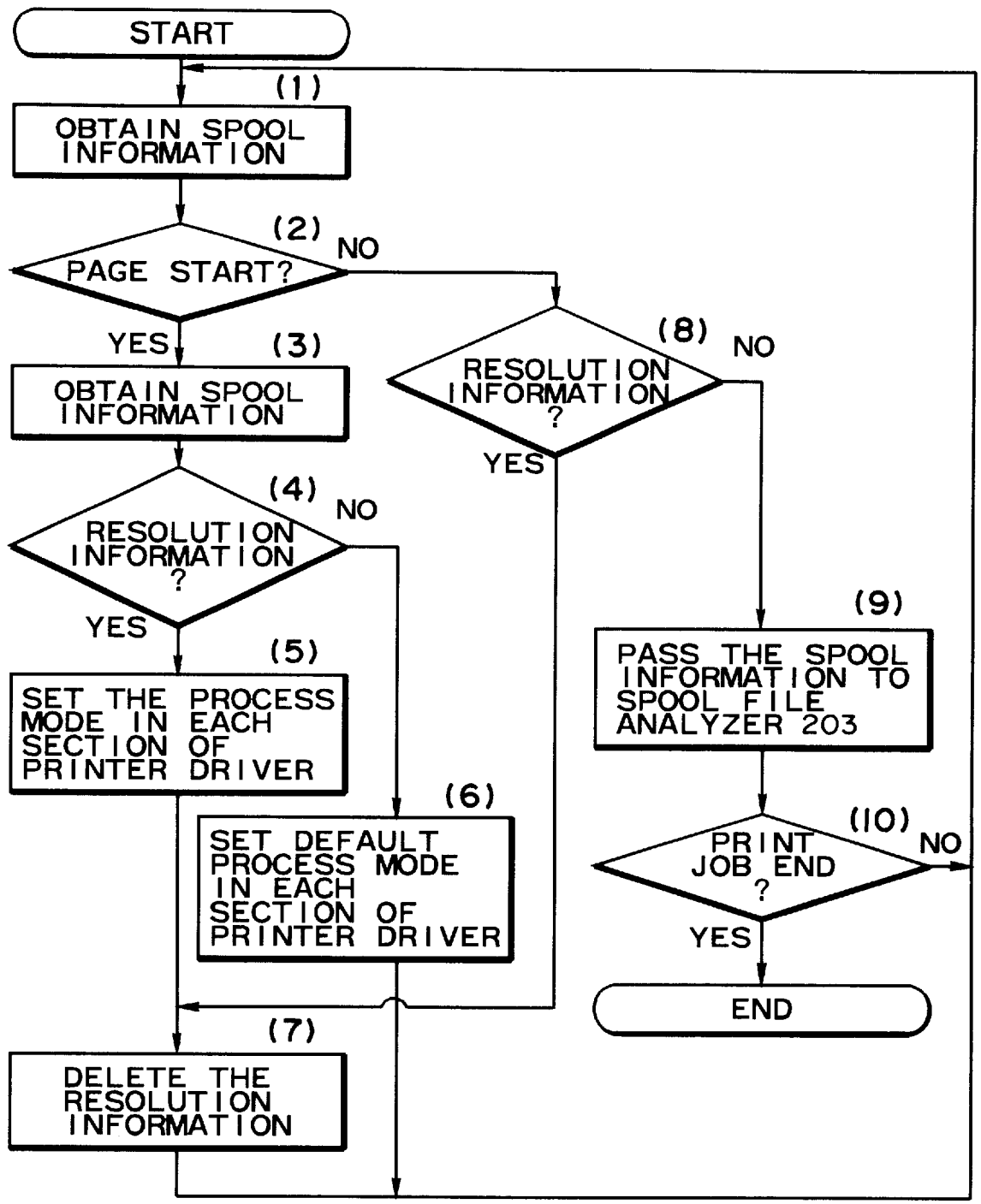
FIG. 10 is a flowchart showing an example of a data processing procedure for a page detection/resolution controller shown in FIG. 7.

The page detection/resolution controller 202 detects a page delimiter of the spool file information transmitted from the despooler 109, extracts processing resolution instruction information of each page, and switches each processing mode in the printer driver 111 in accordance with a procedure shown in FIG. 10.

FIG. 10 is a flowchart showing an example of a data processing procedure of the page detection/resolution controller 202 shown in FIG. 7. Reference numerals (1) to (10) denote processing steps, respectively.

First, spool information is obtained (1). When a page start is detected (2), the spool information is subsequently obtained (3). A check is made to see if the page parameter PP indicative of the processing resolution information has been set in the spool information (it has been stored after the delimiter of the page by the resolution discriminator 201) (4). When it is determined that the processing resolution information has been set in the spool information, its processing mode is set into each section of the printer driver 111 (5). The processing resolution information is deleted from the spool information (7). The processing routine is returned to step (1).

When it is determined in step (4) that the processing resolution information is not set in the spool information, a predetermined default mode is set into each section of the printer driver 111. The processing routine is returned to step (1).

When it is decided in step (2) that a timing is not the timing just after the page start, a check is made to see if the spool information obtained in step (3) is the processing resolution information (8). If YES, the processing routine is returned to step (7) and the information is deleted as being invalid.

When it is decided in step (8) that the spool information is not the processing resolution information, the obtained spool file information is supplied to a spool file analyzer 203 (9). Subsequently, a check is made to see if a timing is the print job end (10). If NO, the processing routine is returned to step (1). If YES, the processing routine is finished.

The spool file analyzer 203 discriminates the contents in the spool file, classifies, and distributes to each processing module in accordance with its category. In case of the printer control information, they are distributed to a printer controller 204. In case of the drawing processing information, they are distributed to an object discriminator 205.

The printer controller 204 converts the received information into the specific control information of the printer in accordance with the logical contents of the printer control information and transmits a printer control command to the printer 102 through printer command controller 211, thereby controlling. In this instance, the printer command controller 211 forms a command which can be actually received by the printer 102.

When the drawing object is vector data, the object discriminator 205 distributes and transmits it to a rasterizer 206. When the drawing object is raster data, the object discriminator distributes and transmits it to a resolution converter 207. The rasterizer 206 and resolution converter 207 form raster data of a resolution that is transmitted to the printer 102 every drawing object. A raster operation unit 208 forms an actual drawing image onto a band buffer [which is provided in a memory resource (not shown)].

A bit length matching unit 212 matches a bit length of each pixel in a manner such that a raster operation can be performed between the bit length of the raster data formed by the rasterizer 206 and the image data. After completion of the drawing of every band, the drawing image is converted into command/data to be transmitted to the printer by the printer command controller 211 through a coloring/coding unit 210 and is transmitted to the printer 102.

The coloring/coding unit 210 converts the drawing information in the band buffer 209 as logical color space information into physical color space data according to the printer engine of the printer 102 and also converts into a code that is actually sent to the printer 102. A y conversion, a binarizing process, a compressing process, and the like are also included in those processes.

The printer command controller 211 converts the drawing raster data and printer control information into commands which can be received by the printer 102 and sends to the I/O controller 112.

On the other hand, the page detection/resolution controller 202 switches processing resolutions of the rasterizer 206, resolution converter 207, and raster operation unit 208 and processing bit lengths of the rasterizer 206 and bit length matching unit 212 in accordance with the processing resolution of each page. In case of the normal resolution, the processing bit length is shortened, thereby suppressing an increase in processing time in association with an increase in resolution.

The operating mode of the coloring/coding unit 210 is switched as necessary. Further, a command is generated through the printer command controller 211 and a processing resolution and a transfer data resolution of such a page are notified to the printer 102.

The printer 102 switches the resolution of the processing data in accordance with the command and executes processes.

According to the embodiment described above, when the resolution discriminator 201 detects the raster image object, it is determined that the gradation significance process is executed to the relevant page, so that the gradation expression of the raster image can be improved.

Fourth Embodiment

The above embodiment has been described with respect to the case of discriminating the processing resolution of each page and storing the instruction information as a page parameter PP into the spool file 108. However, it is also possible to control in a manner such that an area of the image object of each page is calculated and when it is equal to or larger than a predetermined value, the relevant page is determined to be a gradation significance page. Such an embodiment will now be described hereinbelow with reference to FIG. 11.

Figure 11:
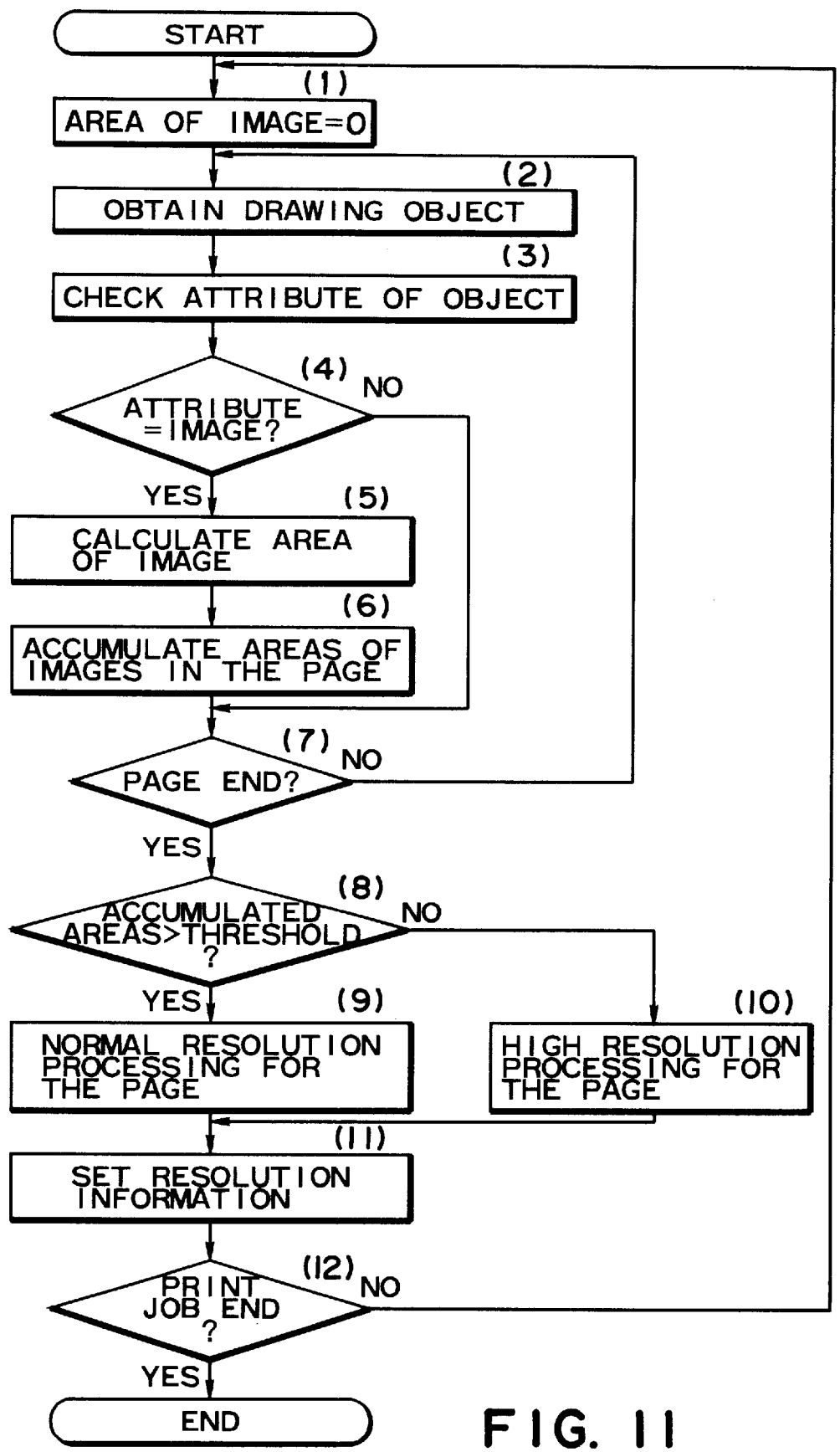
FIG. 11 is a flowchart showing an example of a second data process of the resolution discriminator shown in FIG. 7.

FIG. 11 is a flowchart showing an example of a second data process of the resolution discriminator 201 shown in FIG. 7. Reference numerals (1) to (12) denote processing steps, respectively.

First, the resolution discriminator 201 initializes the area of image to "0" prior to executing a new page process (1). Subsequently, the drawing object is obtained from the spooler 105 (2). An attribute is checked (3). A check is made to see if the obtained drawing object is an image object (4). If YES, an area of image is calculated (5). Areas of images in the page are accumulated (6).

Subsequently, a check is made to see if the discriminating process of the drawing object has been performed up to the page end (7). If NO, the processing routine is returned to step (2) and similar processes are repeated.

On the other hand, when it is determined in step (7) that the discriminating process of the drawing object has been performed up to the page end, a check is made to see if the accumulated value is larger than a predetermined threshold value (8). When it is decided that the accumulated value is equal to or less than the threshold value, the page is regarded as a resolution significance page and the process is determined to be the high resolution processing (10). Step (11) and subsequent steps are executed.

When it is determined in step (8) that the accumulated value is larger than the predetermined threshold value, the page is regarded as a gradation significance page and the process is determined to be the normal resolution processing (9). Subsequently, processing resolution information is set after the page delimiter (11). A check is made to see if the discriminating process has been completed up to the print job end (12). If NO, the processing routine is returned to step (1) and similar processes are repeated.

When it is decided in step (12) that the discriminating process has been completed up to the print job end, the processing routine is finished.

According to the embodiment mentioned above, since the resolution discriminator 201 calculates the total value of the areas of all of the image objects of each page and discriminates, an accuracy of the resolution discrimination can be improved.

Fifth Embodiment

The above embodiment has been described with respect to the case where the processing resolution of each page is discriminated and its instruction information is stored as a page parameter PP into the spool file 108. However, it is also possible to control in a manner such that although an area of image object of each page is calculated and used as an element for discrimination of the processing resolution, the calculated area is compared with a threshold value different from that in the second embodiment, namely, with a value inputted by the user through the user interface 901 instead of the predetermined threshold value, and when it is equal to or larger than a predetermined value, the page is determined to be the gradation significance page. An embodiment in such a case will now be described hereinbelow with reference to FIG. 12.

Figure 12:
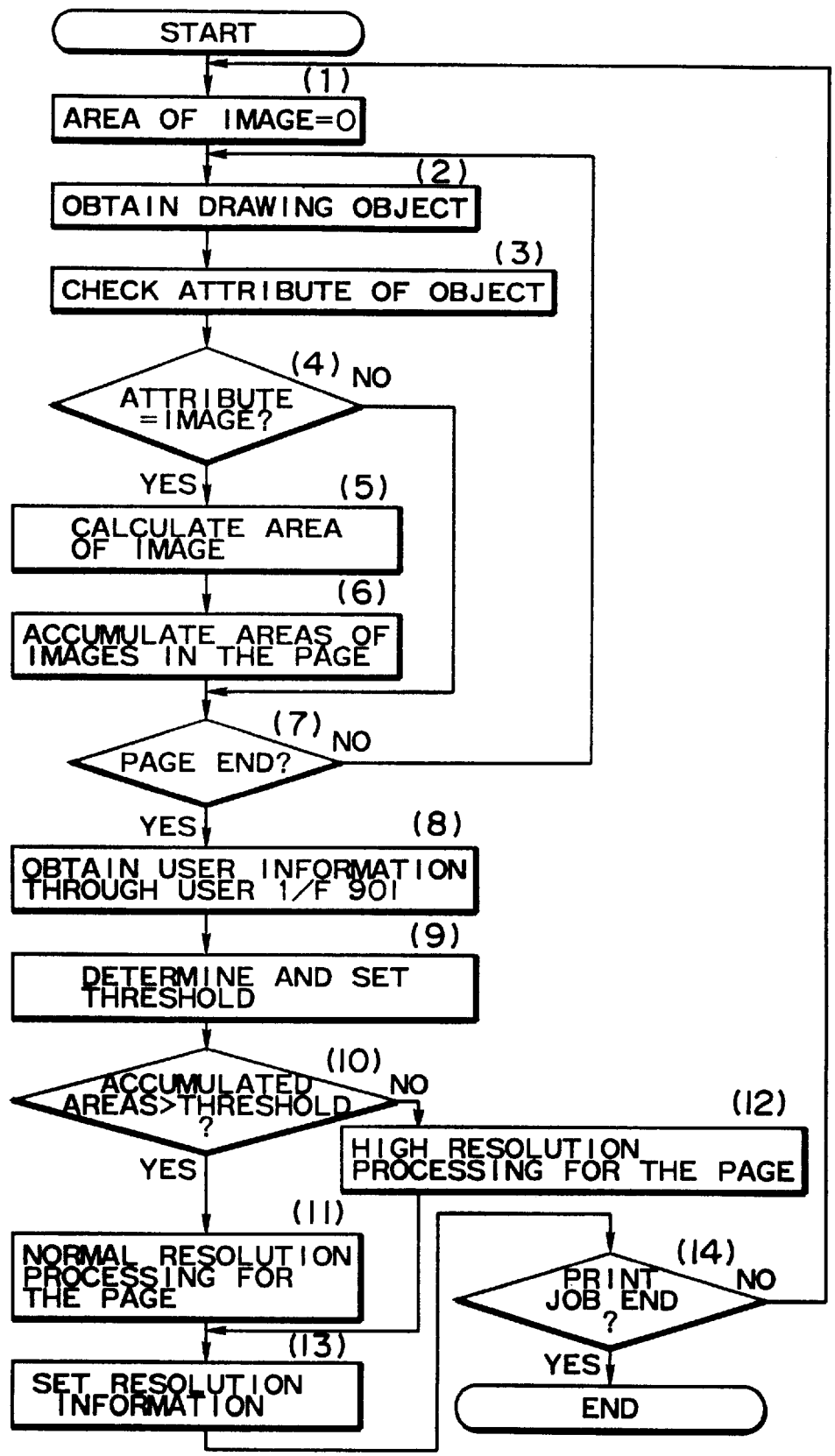
FIG. 12 is a flowchart showing an example of a third data process of the resolution discriminator shown in FIG. 7.

FIG. 12 is a flowchart showing an example of a third data process of the resolution discriminator 201 shown in FIG. 7. Reference numerals (1) to (14) denote processing steps, respectively.

First, the resolution discriminator 201 initializes the area of image to "0" prior to executing a new page process (1). Subsequently, the drawing object is obtained from the spooler 105 (2) and its attribute is checked (3). A check is made to see if the obtained drawing object is an image object (4). If YES, an area of image is calculated (5). The areas of the images in the page are accumulated (6).

Subsequently, a check is made to see if the discriminating process of the drawing object has been performed up to the page end (7). If NO, the processing routine is returned to step (2) and similar processes are repeated.

When it is determined in step (7) that the discriminating process of the drawing object has been performed up to the page end, information set by the user through the user interface 901 is obtained (8). A threshold value is determined from the obtained information and is set (9).

A check is now made to see if the accumulated value is larger than the threshold value set by the user (10). When it is determined that the accumulated value is equal to or less than the threshold value, the page is regarded as a resolution significance page and the process is determined to be the high resolution processing (12). The processing routine advances to step (13) and subsequent steps.

When it is decided in step (10) that the accumulated value is larger than the predetermined threshold value, the page is regarded as a gradation significance page and the process is determined to be the normal resolution processing (11). Subsequently, processing resolution information is set after a delimiter of the page (13). A check is made to see if the discriminating process has been completed up to the print job end (14). If NO, the processing routine is returned to step (1) and similar processes are repeated.

On the other hand, when it is decided in step (14) that the discriminating process has been completed up to the print job end, the processing routine is finished.

In the embodiment, the user inputting operation via the user interface 901 is ordinarily executed when a printing operation is instructed from the application. In the user input, if the user inputs such that the print job indicates the data mainly composed of the text/graphics, the threshold value is set to a high value, thereby making it possible to easily discriminate that the process is the high resolution processing. When the user inputs such that the print job indicates the data mainly composed of the image, the threshold value is set to a low value, thereby making it possible to easily execute the gradation significance process.

According to the foregoing embodiment, in the resolution discriminator 201, the process to which a resolution. That is, the execution of the high resolution processing denotes that it is possible to limit to the drawing objects of those specific colors.

Figure 13:
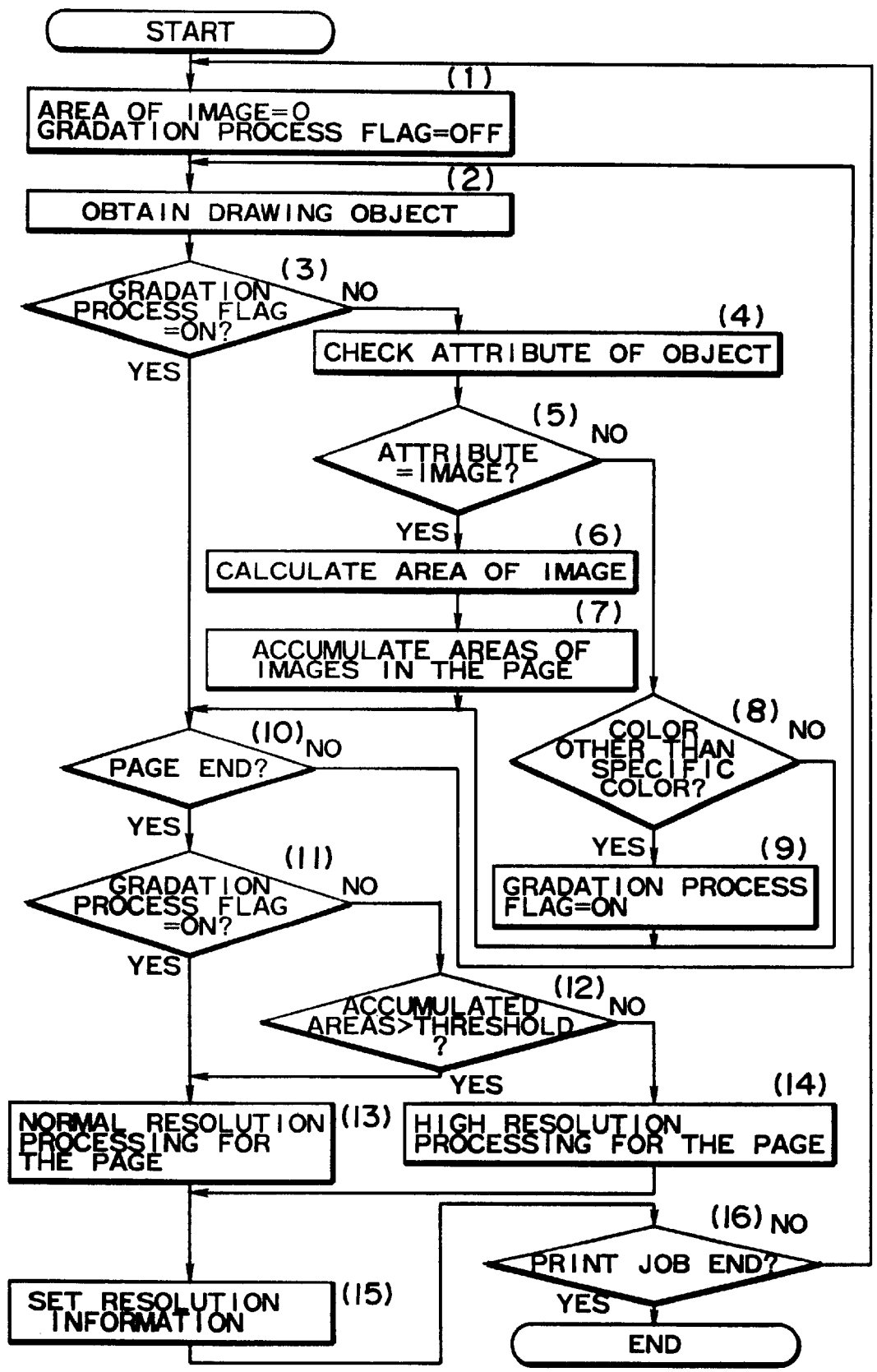
FIG. 13 is a flowchart showing an example of a fourth data process of the resolution discriminator shown in FIG. 7.

FIG. 13 is a flowchart showing an example of a fourth data process of the resolution discriminator 201 shown in FIG. 7. Reference numerals (1) to (16) denote processing steps, respectively.

First, the resolution discriminator 201 initializes an area of image to "0" prior to executing a new page process and also initializes the gradation process flag to OFF (1). Subsequently, when the drawing object is obtained from the spooler 105 (2), the gradation process flag is checked, thereby discriminating whether it is ON or not. When the gradation process flag is determined to be ON, since a fact that the relevant page is a gradation significance page has been specified, the drawing objects are skipped up to the page end (10).

When it is decided in step (3) that the gradation process flag is OFF, the attribute of the obtained drawing object is checked (4), thereby discriminating whether it indicates the image or not (5). If YES, an area of image in the page is calculated (6). The areas of the images are accumulated (7). The processing routine is returned to step (10).

When it is determined in step (5) that the attribute does not indicate the image object, a check will of the user is reflected can be performed.

Sixth Embodiment

The above embodiment has been described with respect to the case of discriminating the processing resolution of each page and its instruction information is stored as a page parameter PP into the spool file 108. However, it is also possible to control in a manner such that an area of an image object of each page is calculated and when it is equal to or larger than a predetermined value, the page is determined to be a gradation significance page or such that in the case where a color other than a specific color exists even in the text/graphics object, a gradation process flag, which will be explained hereinlater, is set and the page is discriminated to be a gradation significance page from the set status of the gradation process flag. An embodiment in such a case will now be described hereinbelow with reference to FIG. 13. In the embodiment, the specific color denotes a color in which when the high resolution processing is performed, edges can be formed at a print resolution of the printer engine. That is, in case of the colors of RGB and YMCK, the edge on the raster data coincides with the dot printed by the printer engine and the edge can be formed. However, in case of the other colors, a half tone has to be expressed by a plurality of dots on the space and the edge cannot be formed at a high made to see if a color other than the specific color is used in the relevant object (8). If YES, the gradation process flag is turned on (9). The processing routine advances to step (10) and subsequent steps.

Subsequently, a check is made to see if the discriminating process has been executed up to the page end (10). If NO, the processing routine is returned to step (2) and similar processes are repeated.

When it is determined in step (10) that the discriminating process has been executed up to the page end, a check is made to see if the gradation process flag is ON (11). If YES, the page is regarded as a gradation significance page and the process is determined to be the normal resolution processing (13). The processing resolution information is set after the delimiter of the page (15).

Subsequently, a check is made to see if the above processes have been executed up to the print job end (16). If NO, the processing routine is returned to step (1) and similar processes are repeated. If YES, the processing routine is finished.

When it is determined in step (11) that the gradation process flag is OFF, the accumulated value of the image objects and a predetermined threshold value are compared, thereby discriminating whether the accumulated value is larger than the threshold value (12). If YES, the page is regarded as a gradation significance page and step (13) follows and the normal resolution processing is executed.

When it is decided in step (12) that the accumulated value is equal to or less than the threshold value, the page is regarded as a resolution significance page and the process is determined to be the high resolution processing (14). Step (15) follows.

According to the foregoing embodiment, in the resolution discriminator 201, the total value of the areas of all of the image objects of each page is calculated and performs the discrimination. Further, even in the text/graphics objects, a point that the color in which the gradation expression is important exists is used as a discrimination element, so that an accuracy of the resolution discrimination can be further improved.

A correspondence between each embodiment and each means of the invention and its operation will now be described hereinbelow with reference to FIGS. 6 and 7 and the like.

According to the invention, there is provided a printer control apparatus for inputting print data including drawing objects of different attributes from a predetermined application program and for converting the print data into print control information of a different resolution which can be processed by the printer 102, comprising: detecting means (page parameter discriminator 107) for analyzing the print data and for detecting the attributes of the drawing objects of each page; and control means (page detection/resolution controller 202) for switching a resolution mode to draw every page on the basis of the attribute detected by the detecting means, wherein the page detection/resolution controller 202 switches a resolution mode to draw on the basis of the attribute detected by the page parameter discriminator 107 for detecting the attributes of the drawing objects of each page by analyzing the print data, so that the resolution processing that is optimum to the attribute of the drawing object in the relevant page can be performed every page and an output quality on the printer side can be improved.

According to the invention, when the page parameter discriminator 107 detects the raster image object as a drawing object, the page detection/resolution controller 202 switches the resolution mode to draw to the normal resolution mode. Therefore, the print information of the resolution that is optimum for the resolution conversion on the printer side can be transmitted to the printer and an output result in which the gradation function of the printer can be most effectively used can be derived.

According to the invention, when the page parameter discriminator 107 detects an object other than the raster image object as a drawing object, the page detection/resolution controller 202 switches the resolution mode to draw to the high resolution mode. Therefore, a character, figure, or the like having a high edge quality can be efficiently outputted from the printer in a short time.

According to the invention, there is provided a printer control apparatus for inputting print data including drawing objects of different attributes from a predetermined application program and for converting the print data into print control information of a different resolution which can be processed by the printer 102, comprising: accumulating means (in the embodiment, the page detection/resolution controller 202) for analyzing the print data and for accumulating areas of rasterized image objects of respective pages; discriminating means (in the embodiment, the page detection/resolution controller 202) for discriminating whether the area value of the rasterized image objects accumulated by the accumulating means exceeds a predetermined threshold value; and control means (in the embodiment, the page detection/resolution controller 202) for switching a resolution mode to draw every page on the basis of the discrimination result of the discriminating means, wherein the page detection/resolution controller 202 analyzes the print data, accumulates areas of the rasterized image objects of the respective pages, discriminates whether the accumulated area value of the rasterized image objects exceeds the predetermined threshold value, and switches the resolution mode to draw every page on the basis of the discrimination result, so that an output result in which a priority is given to the gradation expression for a page in which an image data amount is relatively larger than the other data amounts can be obtained.

According to the invention, there is provided a printer control apparatus for inputting print data including drawing objects of different attributes from a predetermined application program and for converting the print data into print control information of a different resolution which can be processed by the printer 102, comprising: accumulating means (in the embodiment, the page detection/resolution controller 202) for analyzing the print data and for accumulating areas of rasterized image objects of respective pages; area discriminating means (in the embodiment, the page detection/resolution controller 202) for discriminating whether the area value of the rasterized image objects accumulated by the accumulating means exceeds a predetermined threshold value; color discriminating means (in the embodiment, the page detection/resolution controller 202) for analyzing the print data and for discriminating whether a print color of the rasterized image object of each page is a color other than a specific color (in the sixth invention, the specific color assumes the same color as the developing color of the printer); and control means (in the embodiment, the page detection/resolution controller 202) for switching a resolution mode to draw every page on the basis of the discrimination results of the area discriminating means and color discriminating means, wherein the page detection/resolution controller 202 analyzes the print data, accumulates the areas of the rasterized image objects, discriminates whether the accumulated area value of the rasterized image objects exceeds a predetermined threshold value or not, analyzes the print data, discriminates whether the print color of the rasterized image object of each page is a color other than the specific color or not, and switches a resolution mode to draw every page on the basis of each discrimination result, so that in case of a page in which an image data amount is relatively larger than the other data amount or/and in the case where an output color of the image data is a color accompanied with a gradation expression, an output result in which a priority is paid to the gradation expression can be obtained.

According to the invention, when the resolution mode is switched to the high resolution mode, the page detection/resolution controller 202 sets the bit length of each pixel of the raster processing to a short value, so that the resolution conversion processing time on the printer side is limited and an output result of a high quality can be obtained.

A correspondence between the embodiment and each processing step of the invention and its operation will now be described hereinbelow with reference to FIGS. 8 to 13 and the like.

According to the invention, there is provided a printer control method of inputting print data including drawing objects of different attributes from a predetermined application program and for converting the print data into print control information of a different resolution which can be processed by the printer 102, wherein a detecting step [steps (1) to (3) in FIG. 9] of analyzing the print data and detecting attributes of drawing objects of respective pages and a switching step [steps (4) to (10) in FIG. 9] of switching a resolution mode to draw every page on the basis of the detected attribute are executed on the basis of a control program stored in a memory resource of a host computer 100, a resolution processing that is optimum to the attribute of the drawing object in the relevant page can be performed every page, and an output quality on the printer side can be improved.

According to the invention, there is provided a memory medium in which a program which can be read out by a computer for inputting print data including drawing objects of different attributes from a predetermined application program and for converting the print data into print control information of a different resolution which can be processed by the printer 102 has been stored, wherein a program which includes a detecting step [steps (1) to (3) in FIG. 9] of analyzing the print data and detecting attributes of drawing objects of respective pages and a switching step [steps (4) to (10) in FIG. 9] of switching a resolution mode to draw every page on the basis of the detected attribute and which can be read by the computer has been stored in the memory medium. That is, a form such that the program codes corresponding to the processing steps shown in FIG. 9 are stored in the memory resource (not shown) of the host computer 100 and the CPU of the host 100 reads out the program codes from the memory medium in which the program codes were stored and executes them is also included in the embodiment of the invention.

According to the invention, there is provided a printer control method of inputting print data including drawing objects of different attributes from a predetermined application program and for converting the print data into print control information of a different resolution which can be processed by the printer 102, wherein an accumulating step [steps (1) to (7) in FIG. 11] of analyzing the print data and accumulating areas of rasterized image objects of respective pages, a discriminating step [step (8) in FIG. 11] of discriminating whether the accumulated area value of the rasterized image objects exceeds a predetermined threshold value or not, and a switching step [steps (9) to (12) in FIG. 11] of switching a resolution mode to draw every page on the basis of the discrimination result are executed on the basis of a control program stored in a memory resource of a host computer 100, and for a page in which an image data amount is relatively larger than the other data amount, an output result in which a priority is given to a gradation expression can be obtained.

According to the invention, there is provided a memory medium in which a program which can be read out by a computer for inputting print data including drawing objects of different attributes from a predetermined application program and for converting the print data into print control information of a different resolution which can be processed by the printer 102 has been stored, wherein a program which includes an accumulating step [steps (1) to (7) in FIG. 11] of analyzing the print data and accumulating areas of rasterized image objects of respective pages, a discriminating step [step (8) in FIG. 11] of discriminating whether the accumulated area value of the rasterized image objects exceeds a predetermined threshold value or not, and a switching step [steps (9) to (12) in FIG. 11] of switching a resolution mode to draw every page on the basis of the discrimination result and which can be read by the computer has been stored in the memory medium. That is, a form such that the program codes corresponding to the processing steps shown in FIG. 11 are stored into the memory resource (not shown) of the host computer 100 and the CPU of the host 100 reads out the program codes from the memory medium in which the program codes were stored and executes them is also included in the embodiment of the invention.

According to the invention, there is provided a printer control method of inputting print data including drawing objects of different attributes from a predetermined application program and for converting the print data into print control information of a different resolution which can be processed by the printer 102, wherein an accumulating step [steps (4) to (7) in FIG. 13] of analyzing the print data and accumulating areas of rasterized image objects of respective pages, a first discriminating step [step (12) in FIG. 13] of discriminating whether the accumulated area value of the rasterized image objects exceeds a predetermined threshold value or not, a second discriminating step [step (8) in FIG. 13] of analyzing the print data and discriminating whether a print color of the rasterized image object of each page is a color other than a specific color or not, and a switching step [steps (13) and (14) in FIG. 13] of switching a resolution mode to draw every page on the basis of the discrimination results of the first and second discriminating steps are executed on the basis of a control program stored in a memory resource of a host computer 100, and in case of a page in which an image data amount is relatively larger than the other data amount or/and in case of a color in which an output color of the image data is a color accompanied with a gradation expression, an output result in which a priority is given to a gradation expression can be obtained.

According to the invention, there is provided a memory medium in which a program which can be read out by a computer for inputting print data including drawing objects of different attributes from a predetermined application program and for converting the print data into print control information of a different resolution which can be processed by the printer 102, wherein a program which includes an accumulating step [steps (4) to (7) in FIG. 13] of analyzing the print data and accumulating areas of rasterized image objects of respective pages, a first discriminating step [step (12) in FIG. 13] of discriminating whether the accumulated area value of the rasterized image objects exceeds a predetermined threshold value or not, a second discriminating step [step (8) in FIG. 13] of analyzing the print data and discriminating whether a print color of the rasterized image object of each page is a color other than a specific color or not, and a switching step [steps (13) and (14) in FIG. 13] of switching a resolution mode to draw every page on the basis of the discrimination results of the first and second discriminating steps and which can be read by the computer has been stored in the memory medium. That is, a form such that the program codes corresponding to the processing steps shown in FIG. 13 are stored into the memory resource (not shown) of the host computer 100 and the CPU of the host 100 reads out the program codes from the memory medium in which the program codes were stored and executes them is also included in the embodiment of the invention.

A construction of a data processing program which can be read out by the data processing system according to the invention will now be described hereinbelow with reference to a memory map shown in FIG. 14.

FIG. 14 is a diagram for explaining a memory map of the memory medium to store various data processing programs which can be read out by the data processing system according to the invention.

Although not shown, there is also a case where information for managing the programs which are stored in the memory medium, for example, version information, person who makes the programs, and the like are also stored and information which depends on the OS or the like on the program reading side, for instance, icons for identifying and displaying the programs and the like are also stored.

Further, data belonging to various programs is also managed in the directory. There is also a case where a program to install various programs into the computer, and in the case where a program to be installed has been compressed, a program to decompress it, and the like are also stored.

The functions shown in FIGS. 8 to 13 in the embodiment can be also executed by the host computer by a program that is installed from the outside. In this case, the invention is also applied to a case where information group including programs is supplied to an output apparatus by a memory medium such as CD-ROM, flash memory, FD, or the like or from an external memory medium through a network.

As mentioned above, the object of the invention is also obviously accomplished by a method whereby a memory medium in which program codes of software to realize the functions of the embodiments mentioned above is supplied to a system or apparatus and a computer (or CPU or MPU) of the system or apparatus reads out and executes the program codes stored in the memory medium.

In this case, the program codes themselves read out from the memory medium realize a novel function of the invention and the memory medium in which the program codes were stored constructs the invention.

As a memory medium to supply the program codes, for example, it is possible to use a floppy disk, a hard disk, an optical disk, a magnetooptic disk, a CD-ROM, a CD-R, a magnetic tape, a non-volatile memory card, an ROM, an EEPROM, or the like.

It will be obviously understood that not only a case where the functions of the foregoing embodiment are realized by executing the program codes read out by the computer but also a case where the OS (operating system) or the like which is running on the computer executes a part or all of the actual processes on the basis of an instruction of the program code and the functions of the foregoing embodiment are realized by those processes are included in the invention.

Further, it will be also obviously understood that a case where after the program codes read out from the memory medium were written in a memory equipped with a function expansion board inserted in the computer or with a function expansion unit connected to the computer, a CPU or the like provided for the function expansion board or function expansion unit executes a part or all of the actual processes on the basis of an instruction of the program codes and the functions of the foregoing embodiment are realized by those processes is also included in the invention.

According to each of the above embodiments, even in the same print job, the processes of the printer driver can be switched so as to optimize an expressing quality and a processing speed of a print result in accordance with the drawing contents every page.

When an area of the raster image in the page is equal to or larger than a predetermined area, the page is regarded as a gradation significance page mainly composed of an image and the process of the printer driver can be switched so as to execute a multigradation expression.

Further, each page is regarded as a gradation significance page including multicolors or half tone and the process of the printer driver can be switched so as to perform a multigradation expression.

In case of the resolution significance page, the mode for the process can be switched to the high resolution mode and the bit length of each pixel of the raster process can be reduced.

As described above, according to the invention, the discriminating means discriminates the attributes of the drawing objects in the print data which is formed by the data processing apparatus, discriminates the kind of resolution processing of each drawing object, selects any one of the drawing processing means every drawing object on the basis of the discrimination result, and switches the resolution process. Therefore, even if the drawing objects of different attributes are included in the same page, each drawing object can be rasterized while switching to the optimum resolution processing.

According to the invention, when the discriminating means determines that the attribute of the drawing object in the print data which is formed by the data processing apparatus is text/graphics data, any one of the drawing processing means rasterizes the drawing object in the high resolution mode, so that the rasterizing process in which a priority is given to the resolution can be performed to each drawing object serving as text/graphics data.

According to the invention, when the discriminating means determines that the attribute of the drawing object in the print data which is formed by the data processing apparatus is the bit map data, any one of the drawing processing means rasterizes the drawing object in the normal resolution mode whose resolution is lower than the maximum resolution at which the printer can perform a drawing process. Therefore, the rasterizing process can be efficiently performed at a low resolution in which importance is preferentially paid to the processing speed and gradation to each drawing object serving as bit map data.

According to the invention, when any one of the drawing processing means rasterizes the drawing object in the normal resolution mode, a predetermined high resolution modifying process is executed to the rasterized data, so that print information such that the image data having excellent gradation can be printed by a printer of a high resolution can be formed in a short time.

According to the invention, when any one of the drawing processing means rasterizes the drawing object in the normal resolution mode or high resolution mode, the print data to be transferred to the printer is formed on the basis of the rasterized data in which each rasterized data is added, so that print information such that even in case of a page in which the drawing objects of different attributes are complicatedly mixed, the drawing process can be continuously performed can be formed.

According to the invention, the discriminating means discriminates the attributes of the drawing objects in the print data which is obtained from the data processing apparatus on a page unit basis, discriminates the kind of resolution processing every page, selects any one of the drawing processing means every page on the basis of the discrimination result, and switches the resolution processing. Therefore, even if the drawing objects of different attributes are included in the same page, the resolution processing of each drawing object is switched on a page unit basis and each drawing object can be rasterized.

According to the invention, when the discriminating means determines that the attribute of the drawing object in the print data which is formed by the data processing apparatus is the text/graphics data, any one of the drawing processing means rasterizes all of the drawing objects in the same page in the high resolution mode serving as a maximum resolution at which the printer can perform the drawing process. Therefore, the print information such that the text/graphics data or the like can be outputted at a high picture quality without jaggy can be formed.

According to the invention, when the discriminating means determines that the attribute of the drawing object in the print data which is formed by the data processing apparatus is the bit map data, any one of the drawing processing means rasterizes all of the drawing objects in the same page in the normal resolution mode whose resolution is lower than the maximum resolution at which the printer can perform the drawing process. Therefore, in the case where the bit map data is included in the same page, the print information such that the bit map data can be outputted with good gradation can be formed.

According to the invention, when any one of the drawing processing means rasterizes the drawing object in the normal resolution mode, a predetermined high resolution modifying process is performed to the rasterized data. Therefore, when the bit map data is included in the same page, the print information such that the bit map data can be outputted with good gradation is formed and the print information such that a jaggy of the text/graphics or the like in the same page is inconspicuous can be formed.

According to the invention, when each drawing processing means rasterizes the drawing object in the normal resolution mode or high resolution mode, the print data to be transferred to the printer is individually formed on the basis of each rasterized data. Therefore, the print data can be converted into the print information such that the printer can print at a high resolution every bit map drawn in each drawing object.

According to the invention, the attributes of the drawing objects in the print data which is formed by the data processing apparatus are discriminated, the kind of resolution processing of each drawing object is discriminated, and each drawing object is subjected to the drawing process at a different resolution every drawing object on the basis of the discrimination result. Therefore, even if the drawing objects of different attributes are included in the same page, each drawing object can be rasterized while switching to the optimum resolution processing.

According to the invention, the attributes of the drawing objects in the print data which is formed by the data processing apparatus are discriminated on a page unit basis, the kind of resolution processing of each drawing object is discriminated, and each drawing object is subjected to the drawing process at a different resolution every page on the basis of the discrimination result. Therefore, even if the drawing objects of different attributes are included in the same page, the resolution processing of each drawing object is switched on a page unit basis and each drawing object can be rasterized.

There are, consequently, advantages such that the printer can print at a high speed from the drawing data including each drawing object of image, text, and graphics in the same page and the print information in which a deterioration of the picture quality is small can be formed, and the like.

As described above, according to the invention, the control means switches the resolution mode to draw every page on the basis of the attribute detected by the detecting means for analyzing the print data and for detecting the attributes of the drawing objects of respective pages. Therefore, the resolution processing that is optimum to the attribute of the drawing object in the relevant page can be performed every page. An output quality on the printer side can be improved.

According to the invention, when the detecting means detects the raster image object as a drawing object, the control means switches the resolution mode to draw to the normal resolution mode. Therefore, the print information of the resolution that is optimum to the resolution conversion on the printer side can be supplied to the printer. An output result in which the gradation function of the printer can be most effectively used can be obtained.

According to the invention, when the detecting means detects an object other than the raster image object as a drawing object, the control means switches the resolution mode to draw to the high resolution mode. Therefore, a character, figure, or the like having a high edge quality can be efficiently outputted from the printer in a short time.

According to the invention, the discriminating means discriminates whether the area value of the rasterized image objects accumulated by the accumulating means for analyzing the print data and for accumulating the areas of the rasterized image objects of each page exceeds the predetermined threshold value or not, and the control means switches the resolution mode to draw every page on the basis of the discrimination result. Therefore, for a page in which the image data amount is relatively larger than the other data amount, an output result in which a priority is given to the gradation expression can be obtained.

According to the invention, the area discriminating means discriminates whether the area value of the rasterized image objects accumulated by the accumulating means for analyzing the print data and for accumulating the areas of the rasterized image objects of respective pages exceeds the predetermined threshold value or not, and when the color discriminating means analyzes the print data and discriminates whether the print color of the rasterized image object of each page is a color other than the specific color, the control means switches the resolution mode to draw every page on the basis of each of the discrimination results. Therefore, in case of a page in which the image data amount is relatively larger than the other data amount or/and in the case where an output color of the image data is a color accompanied with the gradation expression, an output result in which a priority is given to the gradation expression can be obtained.

According to the invention, when the resolution mode is switched to the high resolution mode, the control means sets the bit length of each pixel of the raster process to a short value. Therefore, the resolution conversion processing time on the printer side is limited and an output result of a high quality can be obtained.

According to the invention, the print data is analyzed, the attributes of the drawing objects of each page are detected, and the resolution mode to draw is switched every page on the basis of the detected attribute. Therefore, the resolution processing that is optimum to the attribute of the drawing object in the relevant page can be performed every page. An output quality on the printer side can be improved.

According to the invention, the print data is analyzed, the areas of the rasterized image objects of respective pages are accumulated, whether the accumulated area value of the rasterized image objects exceeds the predetermined threshold value or not is discriminated, and the resolution mode to draw is switched every page on the basis of the discrimination result. Therefore, for a page in which the image data amount is relatively larger than the other data amount, an output result in which a priority is given to the gradation expression can be obtained.

According to the invention, the print data is analyzed, the areas of the rasterized image objects of respective pages are accumulated, whether the accumulated area value of the rasterized image objects exceeds the predetermined threshold value or not is discriminated, the print data is analyzed, whether the print color of the rasterized image object of each page is a color other than the specific color or not is discriminated, and the resolution mode to draw is switched every page on the basis of each of the discrimination results. Therefore, in case of a page in which the image data amount is relatively larger than the other data amount or/and in the case where the output color of the image data is a color accompanied with the gradation expression, an output result in which a priority is given to the gradation expression can be obtained.

Therefore, there are advantages such that the resolution processing that is optimum to the attribute of the drawing object of each page is executed and the image output in which the gradation function on the printer side can be most effectively used and the high quality output of a character, figure, or the like can be reconciled, and the like.

What is claimed is:

1. An information processing apparatus comprising:
   a first discriminator, arranged to discriminate whether high-gradation processing has been set;
   a second discriminator, arranged to analyze drawing information, including a plurality of drawing objects in a page, and to discriminate whether or not an image corresponding to an image drawing object has an area equal to or larger than a predetermined value, when said first discriminator discriminates that high-gradation processing has not been set; and
   an image generator, arranged to generate a drawing image with a first resolution from the drawing information analyzed by said second discriminator, when said first discriminator discriminates that high-gradation processing has been set or when said second discriminator discriminates that the image has an area equal to or larger than the predetermined value, and to generate a drawing image with a second resolution higher than the first resolution from the analyzed drawing information when said second discriminator discriminates that the image has an area smaller than the predetermined value.

2. An apparatus according to claim 1, further comprising:
   a value setter, arranged to set the predetermined value.

3. An apparatus according to claim 1, further comprising:
   a gradation setter, arranged to set high-gradation processing.

4. An apparatus according to claim 1, further comprising:
   a transmitter, arranged to transmit the drawing image generated by said image generator to a printer.

5. An apparatus according to claim 1, further comprising:
   a printer, arranged to print the drawing image generated by said image generator.

6. An information processing method comprising:
   a first discrimination step of discriminating whether high-gradation processing has been set;
   a second discrimination step of analyzing drawing information, including a plurality of drawing objects in a page, and discriminating whether or not an image corresponding to an image drawing object has an area equal to or larger than a predetermined value, when said first discrimination step discriminates that high-gradation processing has not been set; and
   an image generation step of generating a drawing image with a first resolution from the drawing information analyzed in said second discrimination step, when said first discrimination step discriminates that high-gradation processing has been set or when said second discrimination step discriminates that the image has an area equal to or larger than the predetermined value, and generating a drawing image with a second resolution higher than the first resolution from the analyzed drawing information when said second discrimination step discriminates that the image has an area smaller than the predetermined value.

7. A method according to claim 6, further comprising:
   a value setting step of setting the predetermined value.

8. A method according to claim 6, further comprising:
   a gradation setting step of setting high-gradation processing.

9. A method according to claim 6, further comprising:
   a transmission step of transmitting the drawing image generated in said image generation step to a printer.

10. A method according to claim 6, further comprising:
    a printing step of printing the drawing image generated in said image generation step.

11. A computer-readable memory medium storing a program for implementing an information processing method, the program comprising:
    code for a first discrimination step of discriminating whether high-gradation processing has been set;
    code for a second discrimination step of analyzing drawing information, including a plurality of drawing objects in a page, and discriminating whether or not an image corresponding to an image drawing object has an area equal to or larger than a predetermined value, when the first discrimination step discriminates that high-gradation processing has not been set; and
    code for an image generation step of generating a drawing image with a first resolution from the drawing information analyzed in the second discrimination step, when the first discrimination step discriminates that high-gradation processing has been set or when the second discrimination step discriminates that the image has an area equal to or larger than the predetermined value, and generating a drawing image with a second resolution higher than the first resolution from the analyzed drawing information when the second discrimination step discriminates that the image has an area smaller than the predetermined value.

12. A memory medium according to claim 11, wherein the program further comprises:
    code for a value setting step of setting the predetermined value.

13. A memory medium according to claim 11, wherein the program further comprises:
    code for a gradation setting step of setting high-gradation processing.

14. A memory medium according to claim 11, wherein the program further comprises:
    code for a transmission step of transmitting the drawing image generated in the image generation step to a printer.

15. A memory medium according to claim 11, wherein the program further comprises:
    code for a printing step of printing the drawing image generated in the image generation step.

16. A computer program product embodying a program for implementing an information processing method, the program comprising:
    code for a first discrimination step of discriminating whether high-gradation processing has been set;
    code for a second discrimination step of analyzing drawing information, including a plurality of drawing objects in a page, and discriminating whether or not an image corresponding to an image drawing object has an area equal to or larger than a predetermined value, when the first discrimination step discriminates that high-gradation processing has not been set; and
    code for an image generation step of generating a drawing image with a first resolution from the drawing information analyzed in the second discrimination step, when the first discrimination step discriminates that high-gradation processing has been set or when the second discrimination step discriminates that the image has an area equal to or larger than the predetermined value, and generating a drawing image with a second resolution higher than the first resolution from the analyzed drawing information when the second discrimination step discriminates that the image has an area smaller than the predetermined value.

17. A program product according to claim 16, wherein the program further comprises:

code for a value setting step of setting the predetermined value.

18. A program product according to claim 16, wherein the program further comprises:

code for a gradation setting step of setting high-gradation processing.

19. A program product according to claim 16, wherein the program further comprises:

code for a transmission step of transmitting the drawing image generated in the image generation step to a printer.

20. A program product according to claim 16, wherein the program further comprises:

code for a printing step of printing the drawing image generated in the image generation step.

* * * * *

UNITED STATES PATENT AND TRADEMARK OFFICE
CERTIFICATE OF CORRECTION

PATENT NO. : 6,678,072 B1
DATED : January 13, 2004
INVENTOR(S) : Yasushi Matsuoka et al.

It is certified that error appears in the above-identified patent and that said Letters Patent is hereby corrected as shown below:

<u>Title page,</u>
Item [57], ABSTRACT,
Line 6, "is" should read -- are --.
Line 9, "rasterizer every" should read -- rasterizer for every --.

<u>Drawings,</u>
Sheet 7, Figure 7, "PASTER" should read -- RASTER --.
Sheet 14, Figure 14, "FORTH" should read -- FOURTH --.

<u>Column 2,</u>
Line 5, "those" should read -- this --.
Line 42, "every" should read -- for every --.
Line 48, "is," should read -- are, --.

<u>Column 3,</u>
Line 24, "important" should read -- importance --.

<u>Column 4,</u>
Line 4, "selected every" should read -- selected for every --.
Line 6, "switched." should read -- switched accordingly. --.
Line 48, "processing every" should read -- processing for every --.
Line 49, "selected every" should read -- selected for every --.
Line 51, "switched." should read -- switched accordingly. --.

<u>Column 5,</u>
Line 64, "every" should read -- for every --.

<u>Column 6,</u>
Line 16, "object," (both occurrence) should read -- object, --.

<u>Column 7,</u>
Line 8, "page" should read -- page, --.
Line 66, "wherein:" should read -- wherein --.

<u>Column 9,</u>
Line 16, "is" should read -- are --.
Line 55, "executed every" should read -- executed for every --.

UNITED STATES PATENT AND TRADEMARK OFFICE
CERTIFICATE OF CORRECTION

PATENT NO. : 6,678,072 B1
DATED : January 13, 2004
INVENTOR(S) : Yasushi Matsuoka et al.

It is certified that error appears in the above-identified patent and that said Letters Patent is hereby corrected as shown below:

Column 10,
Line 15, "selected every" should read -- selected for every --.
Line 16, "switched." should read -- switched accordingly. --.
Line 55, "drawn can" should read -- drawn and can --.

Column 11,
Line 35, "an" should read -- a --.
Line 48, "object" should read -- object, --.
Line 64,. "every" should read -- for every --.

Column 13,
Lines 2 and 6, "processing every" should read -- processing for every --.
Line 9, "switched every" should read -- switched for every --.
Line 52, "drawn every" should read -- drawn for every --.

Column 14,
Line 33, "an" should read -- a --.
Line 46, "apparatus" should read -- apparatus, --.

Column 15,
Line 33, "an" should read -- a --.
Lines 41 and 51, "embodiment are" should read -- embodiment which are --.

Column 16,
Line 7, "were" should read -- are --.
Line 63, "drawing every" should read -- drawing for every --.

Column 17,
Lien 67, "was" should read -- is --.

Column 19,
Line 15, "102 every' should read -- 102 for every --.
Line 30, "y conversion" should read -- $\gamma$ conversion --.
Line 35, "sends to" should read -- sends them to --.

Column 20,
Lines 3, 26, 32 and 60, "significane" should read -- significant --.

UNITED STATES PATENT AND TRADEMARK OFFICE
CERTIFICATE OF CORRECTION

PATENT NO. : 6,678,072 B1
DATED : January 13, 2004
INVENTOR(S) : Yasushi Matsuoka et al.

It is certified that error appears in the above-identified patent and that said Letters Patent is hereby corrected as shown below:

Column 21,
Lines 20, 25 and 45, "significane" should read -- significant --.

Column 21, lines 47 through Column 22, line 6,

"resolution. That is, the execution of the high resolution processing denotes that it is possible to limit to the drawing objects of those specific colors.
 Fig. 13 is a flowchart showing an example of a fourth data process of the resolution discriminator 201 shown in Fig. 7. Reference numerals (1) to (16) denote processing steps, respectively.
 First, the resolution discriminator 201 initializes an area of image to "0" prior to executing a new page process and also initializes the gradation process flag to OFF (1). Subsequently, when the drawing object is obtained from the spooler 105 (2), the gradation process flag is checked, thereby discriminating whether it is ON or not. When the gradation process flag is determined to be ON, since a fact that the relevant page is a gradation significance page has been specified, the drawing objects are skipped up to the page end (10).
 When it is decided in step (3) that the gradation process flag is OFF, the attribute of the obtained drawing object is checked (4), thereby discriminating whether it indicates the image or not (5). If YES, an area of image in the page is calculated (6). The area of the images are accumulated (7). The processing routine is returned to step (10).
 When it is determined in step (5) that the attribute does not indicate the image object, a check"

should read

--will of the user is reflected can be performed.
Sixth embodiment
 The above embodiment has been described with respect to the case of discriminating the processing resolution of each page and its instruction information is stored as a page parameter PP into the spool file 108. However, it is also possible to control in a manner such that an area of an image object of each page is calculated and when it is equal to or larger than a predetermined value, the page is determined to be a gradation significant page or such that in the case where a color other than a specific color exists even in the text/graphics object, a gradation process flag, which will be explained hereinlater, is set and the page is discriminated to be a gradation significant page from the set status of the gradation process flag. An embodiment in such a case will now be described hereinbelow with reference to Fig. 13. In the embodiment, the specific color denotes a color in which when the high resolution processing is performed, edges can be formed at a print resolution of the printer engine. That is, in case of the colors of RGB and YMCK, the edge on the raster data coincides with the dot printed by the printer engine and the edge can be formed. However, in case of the other colors, a half tone has to be expressed by a plurality of dots on the space and the edge cannot be formed at a high--.

UNITED STATES PATENT AND TRADEMARK OFFICE
CERTIFICATE OF CORRECTION

PATENT NO. : 6,678,072 B1
DATED : January 13, 2004
INVENTOR(S) : Yasushi Matsuoka et al.

It is certified that error appears in the above-identified patent and that said Letters Patent is hereby corrected as shown below:

Column 22,
Lines 6-31, "will of the user is reflected can be performed.

Sixth Embodiment
    The above embodiment has been described with respect to the case of discriminating the processing resolution of each page and its instruction information is stored as a page parameter PP into the spool file 108. However, it is also possible to control in a manner such that an area of an image object of each page is calculated and when it is equal to or larger than a predetermined value, the page is determined to be a gradation significance page or such that in the case where a color other than a specific color exists even in the text/graphics object, a gradation process flag, which will be explained hereinlater, is set and the page is discriminated to be a gradation significance page from the set status of the gradation process flag. An embodiment in such a case will now be described hereinbelow with reference to Fig. 13. In the embodiment, the specific color denotes a color in which when the high resolution processing is performed, edges can be formed at a print resolution of the printer engine. That is, in case of the colors of RGB and YMCK, the edge on the raster data coincides with the dot printed by the printer engine and the edge can be formed. However, in case of the other colors, a half tone has to be expressed by a plurality of dots on the space and the edge cannot be formed at a high"

should read

--resolution. That is, the execution of the high resolution processing denotes that it is possible to limit to the drawing objects of those specific colors.
    Fig. 13 is a flowchart showing an example of a fourth data process of the resolution discriminator 201 shown in Fig. 7. Reference numerals (1) to (16) denote processing steps, respectively.
    First, the resolution discriminator 201 initializes an area of image to "0" prior to executing a new page process and also initializes the gradation process flag to OFF (1). Subsequently, when the drawing object is obtained from the spooler 105 (2), the gradation process flag is checked, thereby discriminating whether it is ON or not. When the gradation process flag is determined to be ON, since a fact that the relevant page is a gradation significant page has been specified, the drawing objects are skipped up to the page end (10).
    When it is decided in step (3) that the gradation process flag is OFF, the attribute of the obtained drawing object is checked (4), thereby discriminating whether it indicates the image or not (5). If YES, an area of image in the page is calculated (6). The areas of the image are accumulated (7). The processing routine is returned to step (10).
    When it is determined in step (5) that the attribute does not indicate the image object, a check--.

Lines 43, 57 and 61, "significane" should read -- significant --.

UNITED STATES PATENT AND TRADEMARK OFFICE
CERTIFICATE OF CORRECTION

PATENT NO. : 6,678,072 B1
DATED : January 13, 2004
INVENTOR(S) : Yasushi Matsuoka et al.

It is certified that error appears in the above-identified patent and that said Letters Patent is hereby corrected as shown below:

Column 27,
Line 22, "an" (first occurrence) should read -- a --.
Lines 30 and 41, "embodiment are" should read -- embodiment which are --.
Lines 50, 53 and 57, "significance" should read -- significant --.
Line 67, "means every" should read -- means for every --.

Column 28,
Line 2, "process." should read -- process accordingly. --.
Line 30, "can" (first occurrence) should read -- which can --.
Line 40, "can" should read -- and can --
Line 46, "means every" should read -- means for every --.
Line 47, "processing." should read -- processing accordingly. --.

Column 29,
Line 4, "can be" should be deleted.
Lines 28 and 38, "resolution every" should read -- resolution for every --.

Column 30,
Line 44, "performed every" should read -- performed for every --.

Signed and Sealed this

Seventh Day of September, 2004

JON W. DUDAS
*Director of the United States Patent and Trademark Office*